United States Patent
Parent et al.

(10) Patent No.: US 9,204,088 B2
(45) Date of Patent: Dec. 1, 2015

(54) SYSTEMS INCLUDING AND METHODS OF OPERATING COMMUNICATION DEVICES ASSIGNED INDIVIDUAL AND GROUP IDENTITIES

(71) Applicants: Jesse Parent, Cottonwood Heights, UT (US); Richard Shields, Salt Lake City, UT (US); Scot L. Brooksby, Highland, UT (US); Merle L. Walker, Sandy, UT (US); Lane Walters, American Fork, UT (US); Jason Andersen, West Jordan, UT (US)

(72) Inventors: Jesse Parent, Cottonwood Heights, UT (US); Richard Shields, Salt Lake City, UT (US); Scot L. Brooksby, Highland, UT (US); Merle L. Walker, Sandy, UT (US); Lane Walters, American Fork, UT (US); Jason Andersen, West Jordan, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 319 days.

(21) Appl. No.: 13/840,046

(22) Filed: Mar. 15, 2013

(65) Prior Publication Data
US 2014/0267580 A1    Sep. 18, 2014

(51) Int. Cl.
*H04M 3/42*    (2006.01)
*H04N 7/14*    (2006.01)
*H04M 7/00*    (2006.01)

(52) U.S. Cl.
CPC .............. *H04N 7/141* (2013.01); *H04M 7/0024* (2013.01)

(58) Field of Classification Search
CPC ........................ H04M 7/0024–7/0057; H04M 2201/39–2201/60; H04M 2203/2061
USPC ................... 348/14.01–14.16; 370/259–271, 370/351–357; 379/201.01, 202.01–207.01, 379/265.01–266.1; 709/201–207, 217–248
See application file for complete search history.

(56) References Cited

U.S. PATENT DOCUMENTS

| | | | |
|---|---|---|---|
| 5,619,555 A | 4/1997 | Fenton et al. | |
| 5,815,563 A | 9/1998 | Ardon et al. | |
| 5,923,733 A | 7/1999 | Binns et al. | |
| 5,930,723 A | 7/1999 | Heiskari et al. | |
| 6,018,668 A | 1/2000 | Schmidt | |
| 6,574,655 B1 | 6/2003 | Libert et al. | |
| 6,993,355 B1 * | 1/2006 | Pershan | 455/518 |
| 7,050,861 B1 | 5/2006 | Lauzon et al. | |
| 7,283,833 B2 * | 10/2007 | Fukui et al. | 455/517 |
| 7,526,306 B2 * | 4/2009 | Brems et al. | 455/518 |

(Continued)

FOREIGN PATENT DOCUMENTS

| | | |
|---|---|---|
| EP | 2 104 324 A2 | 9/2009 |
| EP | 2 369 883 A1 | 9/2011 |

(Continued)

OTHER PUBLICATIONS

1Number User Guide The Z, at http://www.zvrs.com/services/features/1number, at least as early as Feb. 8, 2012.

(Continued)

*Primary Examiner* — Hemant Patel
(74) *Attorney, Agent, or Firm* — TraskBritt

(57) ABSTRACT

Systems and methods for operating a plurality of communication devices configured to be associated with a user group. Each communication device of the plurality of communication devices may be configured to communicate with one or more servers both as an individual communication device with an individual unique identifier assigned thereto and as the user group with a group unique identifier assigned thereto.

26 Claims, 13 Drawing Sheets

(56) References Cited

U.S. PATENT DOCUMENTS

| | | |
|---|---|---|
| 7,801,953 B1 | 9/2010 | Denman et al. |
| 7,853,703 B1 | 12/2010 | McBarron et al. |
| 8,223,930 B2 * | 7/2012 | Narang et al. ............. 379/88.12 |
| 8,289,900 B2 | 10/2012 | DuMas et al. |
| 8,358,765 B1 | 1/2013 | Whitten et al. |
| 8,520,807 B1 | 8/2013 | Hewinson |
| 2002/0057783 A1 | 5/2002 | Kredo et al. |
| 2003/0009592 A1 | 1/2003 | Stahura |
| 2003/0041138 A1 | 2/2003 | Kampe et al. |
| 2003/0086554 A1 | 5/2003 | Krimstock et al. |
| 2003/0093537 A1 | 5/2003 | Tremlett et al. |
| 2003/0097466 A1 | 5/2003 | Sung |
| 2003/0125072 A1 | 7/2003 | Dent |
| 2004/0081136 A1 | 4/2004 | Brown et al. |
| 2004/0137882 A1 | 7/2004 | Forsyth |
| 2004/0223598 A1 | 11/2004 | Spiridellis |
| 2005/0267876 A1 | 12/2005 | Watanabe et al. |
| 2006/0099983 A1 * | 5/2006 | Kim .............................. 455/518 |
| 2006/0230043 A1 | 10/2006 | Sumner-Moore |
| 2007/0167141 A1 | 7/2007 | Akiyama |
| 2007/0232342 A1 | 10/2007 | Larocca |
| 2007/0280464 A1 | 12/2007 | Hughes et al. |
| 2008/0002671 A1 | 1/2008 | Nagai |
| 2008/0037745 A1 | 2/2008 | Ramamoorthy et al. |
| 2008/0037748 A1 | 2/2008 | Jefferson et al. |
| 2008/0064350 A1 | 3/2008 | Winkler |
| 2008/0119172 A1 | 5/2008 | Rao et al. |
| 2008/0189351 A1 | 8/2008 | Nemoto et al. |
| 2008/0288494 A1 | 11/2008 | Brogger et al. |
| 2009/0013380 A1 | 1/2009 | Chandrasiri et al. |
| 2009/0034696 A1 | 2/2009 | Ramanathan |
| 2009/0106199 A1 | 4/2009 | Wang |
| 2009/0238356 A1 * | 9/2009 | Kojo et al. .............. 379/206.01 |
| 2010/0136980 A1 | 6/2010 | Linquist et al. |
| 2010/0184454 A1 | 7/2010 | Luft et al. |
| 2011/0135077 A1 | 6/2011 | Wengrovitz |
| 2011/0142221 A1 | 6/2011 | Tofighbakhsh et al. |
| 2011/0199915 A1 | 8/2011 | Santhanam et al. |
| 2011/0270880 A1 | 11/2011 | Jesse et al. |
| 2011/0317684 A1 | 12/2011 | Lazzaro et al. |
| 2012/0028618 A1 | 2/2012 | Goel et al. |
| 2012/0102073 A1 | 4/2012 | Patel |
| 2012/0220325 A1 | 8/2012 | Zhou et al. |
| 2012/0257756 A1 | 10/2012 | Huang et al. |
| 2012/0296756 A1 | 11/2012 | Shah |
| 2012/0314849 A1 | 12/2012 | LeBlanc et al. |
| 2013/0010708 A1 | 1/2013 | Abraham et al. |
| 2013/0021957 A1 | 1/2013 | Fang et al. |
| 2013/0070912 A1 | 3/2013 | Parandekar et al. |
| 2013/0100870 A1 | 4/2013 | Xie et al. |
| 2013/0223318 A1 | 8/2013 | Liu et al. |
| 2014/0148136 A1 | 5/2014 | Thange |
| 2014/0267580 A1 | 9/2014 | Parent et al. |
| 2014/0272814 A1 | 9/2014 | Parent et al. |
| 2014/0280562 A1 | 9/2014 | Shields |
| 2014/0282041 A1 | 9/2014 | Walker et al. |
| 2014/0282095 A1 | 9/2014 | Walters et al. |

FOREIGN PATENT DOCUMENTS

| | | |
|---|---|---|
| WO | WO 00/30374 | 5/2000 |
| WO | WO 2005/101757 A1 | 10/2005 |
| WO | WO 2008/124447 A1 | 10/2008 |

OTHER PUBLICATIONS

1Number Quick Start Guide, at http://www.zvrs.com/services/features/1number, at least as early as Feb. 8, 2012.

Z-20 User Guide, at http://www.zvrs.com/products/hardware/z-20/, at least as early as Feb. 7, 2012.

* cited by examiner

SYSTEMS INCLUDING AND METHODS OF OPERATING COMMUNICATION DEVICES ASSIGNED INDIVIDUAL AND GROUP IDENTITIES

CROSS-REFERENCE TO RELATED APPLICATION

This application is related to U.S. patent application Ser. No. 13/837,619, entitled "COMMUNICATION SYSTEMS AND RELATED METHODS FOR COMMUNICATING WITH DEVICES HAVING A PLURALITY OF UNIQUE IDENTIFIERS," filed on Mar. 15, 2013, U.S. patent application Ser. No. 13/840,659, entitled "USER INTERFACE FOR CREATING AND ADMINISTERING A USER GROUP AND METHODS OF OPERATING SUCH," filed on Mar. 15, 2013, U.S. patent application Ser. No. 13/839,384, entitled "SYSTEMS, METHODS, AND DEVICES FOR REPLACING A CONTACT ENTRY CORRESPONDING TO A COMMUNICATION DEVICE WITH A CONTACT ENTRY CORRESPONDING TO A USER GROUP," filed on Mar. 15, 2013, and U.S. patent application Ser. No. 13/837,619, entitled "COMMUNICATION SYSTEMS AND RELATED METHODS FOR NOTIFYING DEVICES HAVING A PLURALITY OF UNIQUE IDENTIFIERS ABOUT MISSED COMMUNICATIONS," filed on Mar. 15, 2013, the disclosure of each of which is incorporated herein by this reference in its entirety.

FIELD

Embodiments of the present disclosure relate to operating a plurality of communication devices both as a user group and as individual communication devices within a communication system. More particularly, the present disclosure relates to operation of video communication devices for the hearing impaired.

BACKGROUND

Video phone communication systems provide visual and audio communication between two or more users during a communication session. A video phone at a first location can transmit and receive audio and video signals to and from a video phone at a second location such that participants at the first location are perceived to be present or face-to-face with participants at a second location and vice versa.

Video phone communication systems span a variety of applications. One contemplated application of a video phone system includes facilitization of a communication session of a hearing-impaired user (e.g., deaf or hard of hearing), because many individuals with significant hearing loss are not able to communicate effectively over conventional telephone systems that rely upon voice communications. The hearing-impaired user may use a video phone during a communication session to relay his or her expressions over the video phone communication system. Such video phone communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS) that may provide an interpretive (i.e., translation) service by providing a hearing-capable translator who relays the expressions of the hearing-impaired caller to a hearing-capable user on the other end of the communication session in a conventional manner, such as through the use of a voice-based dialogue conveyed over a conventional voice phone. The hearing-capable translator may also translate the voice-based dialogue back to the hearing-impaired user into expressions (e.g., American Sign Language (ASL)).

As a consequence of the recent proliferation of communication devices, many people own several communication devices capable of video calls. For example, a single user may have one or more video phones at home, one or more video phones at their place of employment, a smart phone device, a tablet computer, a laptop computer, and/or a personal computer. The user may use some or all of these communication devices for video calls.

Conventionally, each of these communication devices are individually managed and are associated with separate user accounts. As a result, a user of multiple communication devices may be required to keep track of different log in credentials for each separate communication device. In addition, each individual communication device may have its own unique identifier (e.g., phone number, IP address, or other similar identifier used by a specific system) that is used to make and receive video calls. As a result, users have the burden of informing others what the unique identifiers are for each individual communication device so that others may contact them. Other people may also be inconvenienced by keeping track of several unique identifiers for the user when dialing a call to or receiving caller identification (caller ID) information from the user's various communication devices.

Also, having a plurality of different communication devices may become burdensome for the user to maintain information among each of their communication devices. For example, if a user desires to block an undesired caller, change device or account settings, access messages, or add new contacts to a directory on one of the communication devices, the action may need to be repeated separately on each of the rest of the communication devices. Furthermore, if a video call is missed on one of the communication devices, the user often only becomes aware of the missed call only when the user is again in the proximity of that particular communication device.

BRIEF SUMMARY

Embodiments of the present disclosure include systems and method for operating a plurality of communication devices both as individual communication devices and as an association with a user group.

In some embodiments, the present disclosure comprises a communication system including a plurality of communication devices configured to be associated with a user group. Each communication device of the plurality of communication devices is configured to communicate with one or more servers responsive to being addressed both with an individual unique identifier assigned thereto and a group unique identifier assigned thereto as a member of the user group.

In other embodiments, the present disclosure comprises a communication system including one or more servers configured to communicate with a plurality of communication devices associated with a user group. The one or more servers are configured to address each of the plurality of communication devices both with an individual unique identifier assigned to each of the plurality of communication devices, and with a group unique identifier assigned to each of the plurality of communication devices as a member of the user group.

In other embodiments, the present disclosure comprises a method of operating a plurality of communication devices.

The method includes operating one or more of a plurality of communication devices with one or more servers. Each of the plurality of communication devices is assigned a different unique identifier of a plurality of individual unique identifiers. The method also includes operating one or more of the plurality of communication devices as a member of a first user group with the one or more servers. The first user group includes a first plurality of communication devices of the plurality of communication devices. The first user group is assigned a first group unique identifier.

In other embodiments, the present disclosure comprises a communication system including a plurality of communication devices. The plurality of communication devices includes a first plurality of communication devices. Each communication device of the plurality of communication devices is configured to communicate with one or more servers responsive to being addressed with a different individual unique identifier. The communication system also includes a first user group including the first plurality of communication devices. The first user group is assigned a first group unique identifier, wherein each of the first plurality of communication devices is configured to communicate with the one or more servers responsive to being addressed with the first group unique identifier.

DETAILED DESCRIPTION

Figure 1:
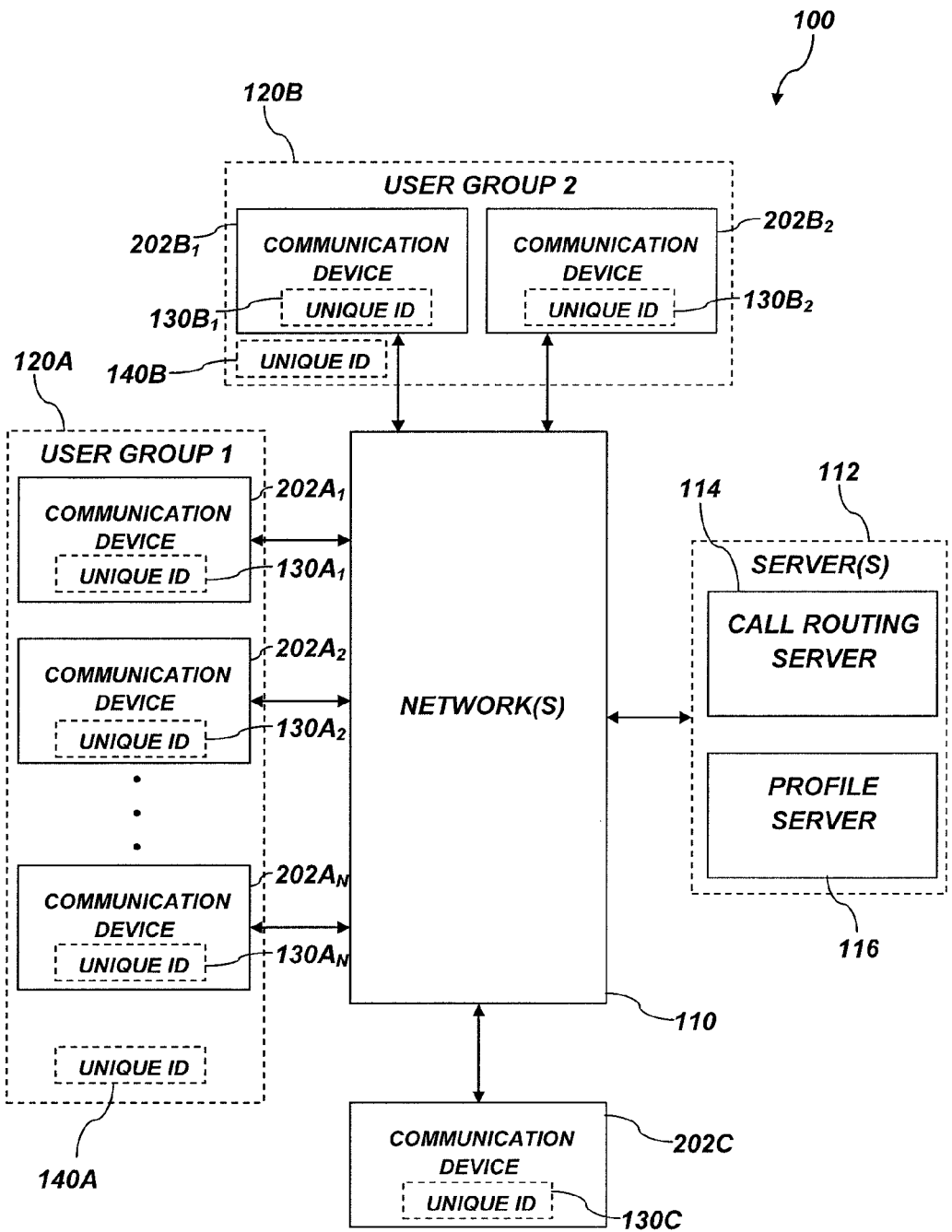
FIG. 1 is a simplified block diagram of a communication system according to an embodiment of the present disclosure.

In the following detailed description, reference is made to the accompanying drawings that form a part hereof, and in which is shown by way of illustration, specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular method, device, or system, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of the present disclosure include systems and methods for operating a plurality of communication devices both as individual communication devices and as a member of a user group, which may include operating video communication devices in video communication systems. As discussed above, video communication systems span a variety of applications. Embodiments of the present disclosure are generally described herein with reference to a video communication system for use by hearing-impaired users. Such video communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS). It should be noted, however, that embodiments of the present disclosure may include any application or environment where operating a plurality of communication devices both as individual communication devices and as a member of a user group may be helpful or desirable. For example, it is contemplated that embodiments of the present disclosure may include video communication session between hearing-capable users.

The term "call" refers to a communication with a communication device that may be routed through a number of networks, such as, for example, a private network, the interne, a telephone system, and a VRS. The term "incoming call" refers to an incoming communication to a communication device.

The term "communication device" may refer to a specific compilation of hardware components, software components, or a combination thereof. The term "communication device" may also refer to a software based communication device that exists on a device configured to execute machine-readable commands, such as, for example a computer. As software, it should be understood that the same communication device may exist on a first device while a user accesses the communication device on the first device, and on a second device at a different time while the user accesses the communication device on the second device.

FIG. 1 is a simplified block diagram of a communication system 100 according to an embodiment of the present disclosure. The communication system 100 may include a plurality of communication devices $202A_1$, $202A_2$, ... $202A_N$, $202B_1$, $B_2$, 202C (which are collectively referred to as communication devices 202). In some instances, reference may be made to an individual communication device by the generic designation of reference numeral 202. The communication system 100 may further include one or more servers 112, with which the communication devices 202 communicate through one or more networks 110. In other words, the communication devices 202 may be configured to establish communication with the one or more servers 112 (also referred to simply as "servers" 112) through the one or more networks 110 (also referred to simply as "networks" 110). The communication devices 202 may be configured to communicate with each other over a video call with the assistance of the servers 112 as described more fully below.

Each of the communication devices 202 may be assigned an individual unique identifier 130. In some instances, reference may be made to an individual unique identifier by the general designation of reference numeral 130. For example, communication devices $202A_1$, $202A_2$, ... $202A_N$ may respectively be assigned an individual unique identifier $130A_1$, $130A_2$, ... $130A_N$. In addition, the communication devices $202B_1$, $202B_2$ may respectively be assigned an individual unique identifier $130B_1$, $130B_2$. The communication device 202C may be assigned an individual unique identifier 130C. The individual unique identifier 130 is, therefore, device-centric rather than user-centric or location-centric. In other words, an individual unique identifier 130 may be associated with an individual communication device 202. In general, individual unique identifiers 130 are not shared by multiple communication devices 202. In some respects, an individual unique identifier 130 may be similar to a telephone number. For example, the individual unique identifier 130 may be used by other people to initiate video calls with the user of the communication device 202 associated with the individual unique identifier 130. In other respects, the individual unique identifier 130 may be similar to an IP address. For example, the individual unique identifier 130 may be used to identify the communication devices 202 to the servers 112. The individual unique identifier 130 may have a numerical format, such as an IP address or a phone number (e.g., a seven digit number, a ten digit number including an area code, etc.). The individual unique identifier 130 may have an alphabetic format (e.g., a word, a phrase, etc.), an alphanumerical format, or other suitable format used to uniquely identify an individual communication device 202. As another non-limiting example, the individual unique identifier 130 may be a Media Access Control (MAC) address, which uniquely identifies a network interface of the communication device 202.

The communication devices 202 may also be associated with one or more user groups 120A, 120B (which are collectively referred to as user groups 120). In some instances, reference may be made to an individual user group by the generic designation of reference numeral 120. A user group 120 may be may be an association (i.e., grouping) of communication devices 202 that are defined as members of the user group 120, as desired by a user. A user group 120 may be associated with any number of communication devices 202 so long as there are at least two communication devices 202 grouped together by the user. By way of non-limiting example, communication devices $202A_1$, $202A_2$, ... $202A_N$ may be associated with a first user group 120A. The first user group 120A may be associated with a first user. Other communication devices $202B_1$, $202B_2$ may be associated with a second user group 120B. The second user group 120B may be associated with a second user. The communication system 100 may include communication devices 202, such as communication device 202C, which may not be associated with any user group.

The user groups 120A, 120B may respectively be assigned group unique identifiers 140A, 140B (which are collectively referred to as group unique identifiers 140). The group unique identifiers 140 are unique to a group rather than to an individual communication device 202. In other words, the group unique identifiers 140 are group-centric, such that the group unique identifiers 140 are not shared by other user groups 120. Therefore, individual communication devices 202 may be associated with both an individual unique identifier 130 and a group unique identifier 140. For example, a first communication device $202A_1$ may be associated with the individual unique identifier $130A_1$ and the group unique identifier 140A. Likewise, a second communication device 202A2 may be associated with the individual unique identifier $130A_2$ and the group unique identifier $140A$. Thus, because the first communication device $202A_1$ and the second communication device $202A_2$ are part of the same user group $120A$, the first communication device $202A_1$ and the second communication device $202A_2$ share the same group unique identifier $140A$ (but not individual unique identifiers $130A_1$, $130A_2$). Other user groups (e.g., user group $120B$) may be similarly configured.

A call may be initiated to the communication devices $202$ by being addressed by either its individual unique identifier $130$ or its group unique identifier $140$. For example, if a person (e.g., the second user) calls the first user by entering the individual unique identifier $130A_1$, only the individual communication device $202A_1$ may indicate an incoming call. If, however, a person calls the first user by entering the group unique identifier $140A$ assigned to the first user group $120A$, each of the communication devices $202A_1$, $202A_2$, ... $202A_N$ of the first user group $120A$ may indicate an incoming call. An incoming call may be indicated visually, tactilely, audibly, or some other suitable indication, and combinations thereof. For hearing-impaired users, an incoming call may be indicated visually, tactilely, and combinations thereof.

As discussed above, the communication devices $202$ may be associated with a user group $120$ as desired by the user. In other words, the reasons for grouping the communication devices $202$ within a particular user group $120$ may be determined by the user acting as a group organizer, rather than any particular limitation. For example, each communication device $202$ belonging to a user group $120$ need not be located in close proximity to each other. By way of non-limiting example, a single user group $120$ may include a communication device $202$ stationed at a user's dwelling, a communication device $202$ at the user's place of employment, a communication device $202$ at the user's cabin, and a portable communication device $202$ that may be carried anywhere. It should also be understood that two or more communication devices $202$ from the same user group $120$ may be located proximate to each other. By way of non-limiting example, two or more communication devices $202$ from the same user group $120$ may be stationed in various locations of the user's home, such as in the living room, the kitchen, the bedroom, etc.

In addition, the communication devices $202$ associated with a single user group $120$ may belong to two or more users. By way of non-limiting example, communication devices $202$ belonging to friends, family members, co-workers, and/or roommates may be part of a single user group $120$. As a result, the user acting as the group organizer may invite others to join one or more of their communication devices $202$ to join his group. For example, a user group $120$ may be a group of co-workers within a team or practice group, such as a technical support team.

A single user group $120$ may also include several different types of communication devices $202$. By way of non-limiting example, an individual user group $120$ may include any one or more of a personal computer, a smart phone, a tablet computer, and a video phone. In addition, a single user group $120$ may include multiple communication devices from the same device type. For example, an individual user group $120$ may have a plurality of video phones within the same individual user group $120$. Furthermore, a single user group $120$ may include any number of communication devices $202$, limited only by the capacity of the communication system $100$, and/or a desire to limit services to user groups $120$ of a predetermined number of communication devices $202$. By way of non-limiting example, administrators of a communication system $100$ may choose to limit the number of communication devices $202$ that a group organizer may be allowed to include within single user group $120$ to a maximum number (e.g., five, six, etc.) of allowed communication devices $202$.

The communication devices $202$ may be configured to enable a user to participate in video calls with the other communication devices $202$ of the communication system $100$. A "video call" refers to communications where real-time or quasi real-time video data is exchanged between at least two parties. A video call may also refer to an attempted initiation of a real-time or quasi real-time video data exchange. For example, a first user using a first communication device $202A_1$ may communicate with one or more other users using any of the other communication devices $202A_2$, ... $202A_N$ associated with the first user group $120A$, the communication devices $202B_1$, $202B_2$ associated with the second user group $120B$, another communication device $202C$ not associated with a user group $120$, and combinations thereof.

Any one of a variety of communication devices $202$ may be configured to place and receive video calls, in part, because advancements in communication device technology have substantially increased the quantity, variety, and affordability of communication devices. By way of non-limiting example, the communication devices $202$ may include any of a video phone, a desktop computer, a laptop computer, a tablet computer, a smart phone, and other suitable devices. Examples of a video phone include the NTOUCH® VP video phone and the VP-200 video phone available from SORENSON COMMUNICATIONS® of Salt Lake City, Utah. More device-level detail on the communication devices $202$ is discussed below with reference to FIG. 2.

The networks $110$ may include an internet protocol network configured to transmit communications between each of the plurality of communication devices $202$ and the servers $112$, such as by using an internet protocol (IP). The networks $110$ may include a wide area network (WAN), a local area network (LAN), a personal area network (PAN), and combinations thereof. In some embodiments, the servers $112$ may be part of a cloud network. The networks $110$ may be configured to communicate with the plurality of communication devices $202$ and the servers $112$ wirelessly, through a cable, and combinations thereof. Some non-limiting examples of suitable wireless communications may include "wifi," Bluetooth, and mobile wireless networks. Some non-limiting examples of suitable cables include fiber-optic cables, coaxial cables, traditional telephone cables, and Ethernet cables.

The servers $112$ may be configured to provide services to the communication devices $202$. For example, the servers $112$ may be configured to manage calling functions, such as video call sessions and messages for the communication devices $202$ of the communication system $100$. In addition, the servers $112$ may store and manage account information for the communication devices $202$. Account information may include address books, account billings, and other information corresponding to the communication device $202$ associated with the individual unique identifier $130$. As non-limiting examples, the servers $112$ may include a call routing server $114$ and a profile server $116$. Although discussed herein separately, the call routing server $114$ and the profile server $116$ may optionally be implemented as a single server device. Likewise, both the call routing server $114$ and the profile server $116$ may optionally include multiple server devices, and the various functions of the call routing server $114$ and the profile server $116$ may not necessarily be isolated to separate devices.

The call routing server $114$ may be configured to set up and control a video call between one or more of the plurality of communication devices 202 and another of the plurality of communication devices 202, or a communication device associated with another user (not shown). The call routing server 114 may be configured to establish and control the video call through, for example, a session initiation protocol (SIP), or other suitable protocol.

The call routing server 114 may also periodically receive communications from each of the plurality of communication devices 202, including location or contact information, so that the call routing server 114 may locate and setup video call sessions with the communication devices 202 as needed. Also, the call routing server 114 may cause a particular communication device 202 to indicate an incoming call responsive to another person entering the individual unique identifier 130 assigned to the particular communication device 202. Furthermore, when the user enters the individual unique identifier 130 associated with another communication device 202 from one of the plurality of communication devices 202, the call routing server 114 may arrange for an outgoing call to be sent to the communication device 202 with the entered individual unique identifier 130 assigned thereto. In addition, when the user enters the group unique identifier 140 associated with a user group 120, the call routing server 114 may arrange for an outgoing call to be sent to each of the communication devices 202 associated with the entered group unique identifier 140 assigned thereto.

The profile server 116 may be configured to manage one or more user accounts associated with the individual unique identifiers 130. In some embodiments, the profile server 116 may also be configured to store information associated with each user account within the communication system 100. By way of non-limiting example, the profile server 116 may be configured to store an address book, a blocked caller list, a message history, text messages, video messages, a call history, personal user information, and combinations thereof, associated with each user account. In other embodiments, each of the communication devices 202 may be configured to store the information associated with the user account corresponding to the individual unique identifier 130 assigned thereto.

The servers 112 may be configured to enable the communication devices 202 to be associated with a user group 120. The user group 120 may, in some respects, function similarly to a separate communication device 102. For example, the user group 120 may be assigned a group unique identifier 140 and be associated with corresponding group account and group information, such as a group blocked caller list, a group message history, group text messages, group video messages, a group call history, a group address book (i.e., contact list), and combinations thereof, which may be stored on the profile server 116. Accessing any communication device 202 in the user group 120 may enable the user to access the group information, and communicate through the networks 110 using the group unique identifier 140 assigned to the user group 120. In some embodiments, group information may simply be a matter of the servers 112 being able to access individual communication device information that is stored for each communication device 202 to be shared with other communication devices 202 of the user group 120.

In some embodiments, where activity performed on a second communication device 202A$_2$ causes changes to the group information, the profile server 116 may communicate the changes in group information to the rest of the plurality of communication devices 202 belonging to the user group 120. Each of the plurality of communication devices 202 may be configured to periodically enter communication with the profile server 116 to receive updates. By way of non-limiting example, each of the plurality of communication devices 202 may be configured to enter communication with the profile server 116 approximately every five minutes (or other periodic interval) to receive updates. In some embodiments, updates may be event-driven such that certain events may cause the profile server 116 to broadcast updates to one or more of the communication devices 202. Initiation of these information updates and synchronizations may be performed by the servers 112 or the communication devices 202.

In some embodiments, the communication device 202 that is the creator of the user group 120 may have its information (e.g., lists) serve as the basis for the shared group information (e.g., shared lists). As discussed above, shared lists may include a blocked caller list, a group message history, group text messages, group video messages, a group call history, a group address book (i.e., contact list). As a result, each of these group lists may be shared and accessible (for viewing, editing, adding to, etc.) by each communication device 202. If a shared group list is changed, the change may be saved within the profile server 116. In addition, the profile server 116 may broadcast a notification to each of the communication devices 202 within the user group 120 that a change has been made to the shared group lists and that their local cache needs to be updated. The individual communication devices 202 may respond (e.g., either immediately or at their next scheduled interval) to receive the updated information to store in their local cache. In addition, there may be shared settings (e.g., group settings) among group members that may be edited and shared in a similar manner. For example, shared settings may include the number of rings that occur before going to voice mail, a common voice mail message that is applied to all communication devices 202 rather than each communication device 202 having its own, among other similar settings.

In some embodiments, the profile server 116 and/or the individual communication devices 202 may retain a prior version of their individual lists and settings that existed before they joined the user group 120. As a result, when a communication device 202 leaves the user group 120, the communication device 202 may no longer have access to the shared group lists and settings and their lists may revert back to the individual state that the communication device maintained prior to joining the user group 120.

Figure 2:
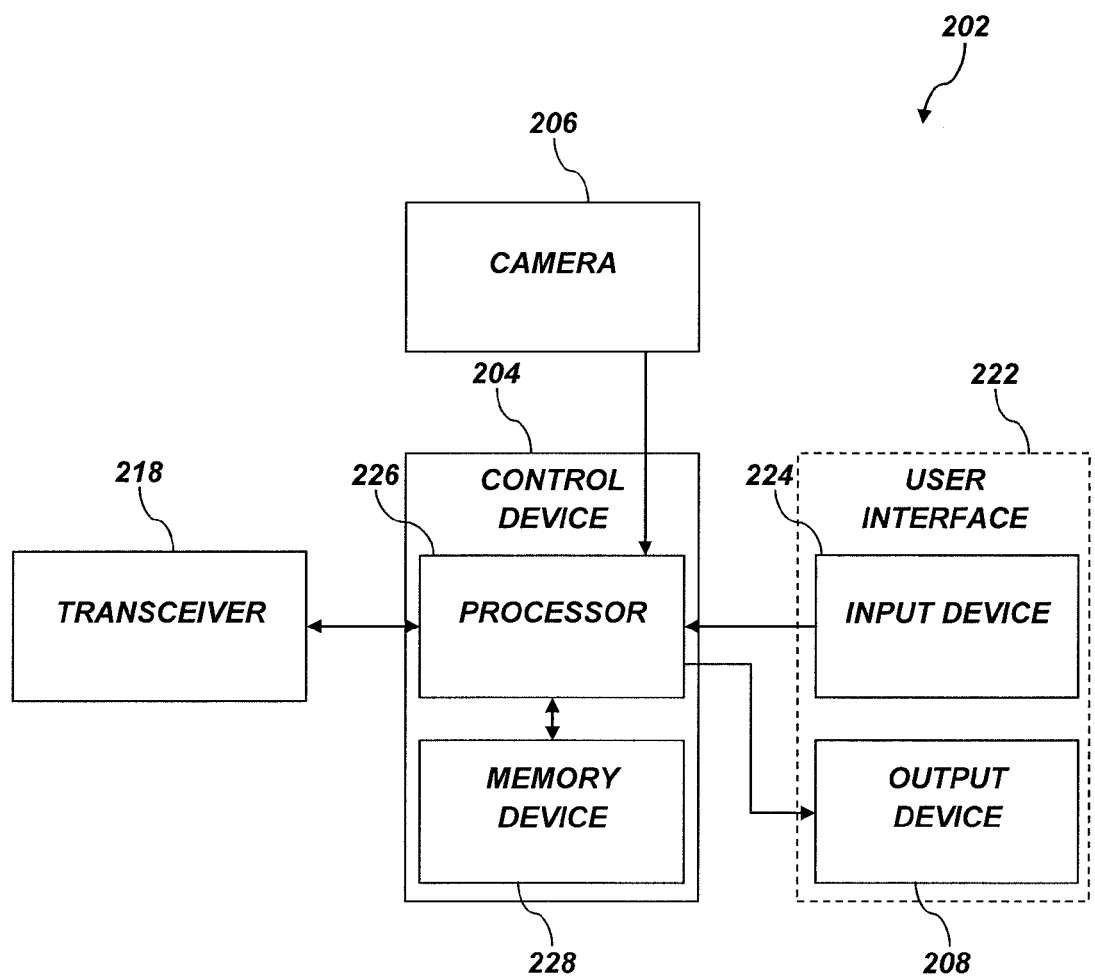
FIG. 2 is a simplified block diagram of a communication device according to some embodiments of the present disclosure.

FIG. 2 is a simplified block diagram of a computing device. The computing device may be a communication device 202 according to some embodiments of the present disclosure. The computing device may also be a server 112 according to some embodiments of the present disclosure. The computing device, whether a server 112 or a communication device 202 will be referred to in the description of FIG. 2 as a communication device 202. The communication device 202 may be one of the communication devices 202 shown in FIG. 1. The communication device 202 may include a control device 204 operably coupled to a camera 206, a transceiver 210, and a user interface 222. The control device 204 may include at least a processor 226 and a memory device 228. The processor 226 may be configured to execute commands stored on the memory device 228. By way of non-limiting example, the memory device 228 may include a computer readable media, such as, read only memory (ROM), random access memory (RAM), flash memory, and combinations thereof. The control device may be configured to control the camera 206, and the user interface 222. In addition, the control device may be configured to cause the transceiver 210 to transmit and receive data through the networks 110.

The camera 206 may include devices capable of capturing and converting visual images to data, as will be readily apparent to those skilled in the art. By way of non-limiting example, the camera may include a webcam, a camcorder device, a camera device integrated into the same enclosure as the control device 204, and other suitable devices. The camera 206 may be operably coupled to the control device 204 and configured to deliver the data to the control device 204.

The user interface 222 may include an input device 224 and an output device 208 operably coupled to the control device 204. By way of non-limiting example, the input device 224 may include a keyboard, a numerical keypad, a mouse, a touch-screen, a button array, a track pad, a remote control, motion sensors, orientation sensors, position sensors, a microphone, and combinations thereof. The input device 224 may be configured to receive commands from the user. Also by way of non-limiting example, the output device 208 may include any of a light-emitting diode (LED) array, a segmented display, a liquid crystal display, a cathode ray tube display, a plasma display, and other electronic displays. The output device 208 may also include other peripheral output devices, such as speakers and vibrators. In some embodiments, the input device 224 and the output device 208 may be integrated in the same device, such as, for example, a touch-screen display. In other embodiments, the input device 224 and the output device 208 may be implemented in separate devices, such as a keyboard and an LCD monitor, respectively.

The control device 204 may cause the output device 208 to display video images received as data at the transceiver 210 during a video call. The control device 204 may also cause the output device 208 to display options on the output device 208, such as through a graphical user interface displayed on the output device 208. In addition, the control device 204 may execute user commands received by the input device 224.

The user interface 222 may enable the user of the communication device 202 to take several types of actions. Some of these actions may include logging in to the communication device 202 as a specific user, creating a new user group 120, inviting another communication device 202 to join a user group 120, withdrawing a communication device 202 from the user group 120, place a video call to another communication device 202, accept an incoming call from another communication device 202, access account information associated with the communication device 202, access account information associated with a user group 120 with which the communication device 202 is associated, etc.

Figure 3A:
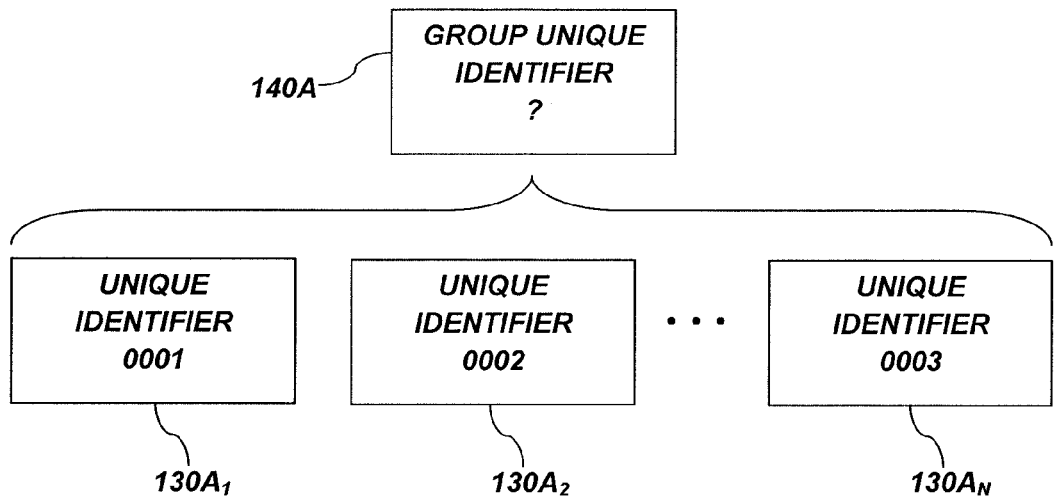
FIGS. 3A and 3B illustrate a method for assigning a group unique identifier to a user group according to an embodiment of the present disclosure.
Figure 3B:
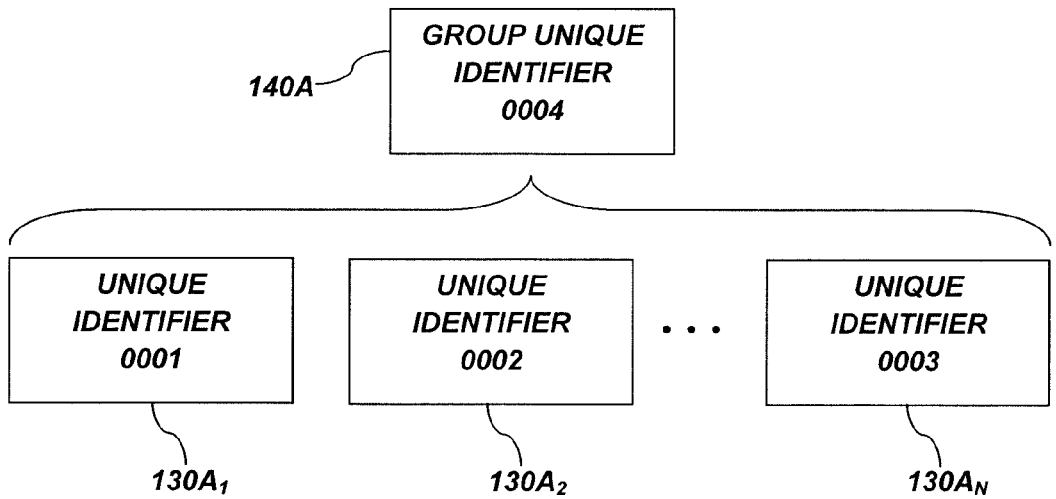

FIGS. 3A and 3B illustrate a method for assigning a group unique identifier 140 to a user group 120 according to an embodiment of the present disclosure. In particular, the first group 120A (FIG. 1) may receive a group unique identifier 140A to be associated with each of the communication devices 202 (FIG. 1) that are members of the first group 120A. As depicted in FIGS. 3A and 3B, the group unique identifier 140A may be a completely new identifier that was not previously an individual unique identifier $130A_1$, $130A_2$, $130A_N$ that is associated with one of the communication of the first user group 120A.

For example, the first user may decide to group together a plurality of communication devices 202, wherein each of the plurality of communication devices 202 have already been assigned their own individual unique identifiers 130. For example, the first communication device $202A_1$ is associated with the first individual unique identifier $130A_1$ of "0001," the second communication device $202A_2$ is associated with the second individual unique identifier $130A_2$ of "0002," and the Nth communication device $202A_N$ is associated with the Nth individual unique identifier $130A_N$ of "0003."

As depicted in FIG. 3A, when the first user group 120A is created, the group unique identifier 140A may be unassigned. As depicted in FIG. 3B, the first user group 120A may be assigned a new group unique identifier 140A that was not previously assigned to any communication device 202 of the newly formed user group 120A. In other words, when the first user group 120A is created, the first user group 120A may be initialized with a new individual unique identifier $130A_1$ assigned thereto. For example, the group unique identifier 140A assigned to the user group 120A is "0004." The four digit unique identifiers 130, 140 are illustrated as a simple example of a unique identifier. As discussed above, the unique identifiers 130, 140 may be a telephone number, IP address, or other suitable identifier.

Figure 4A:
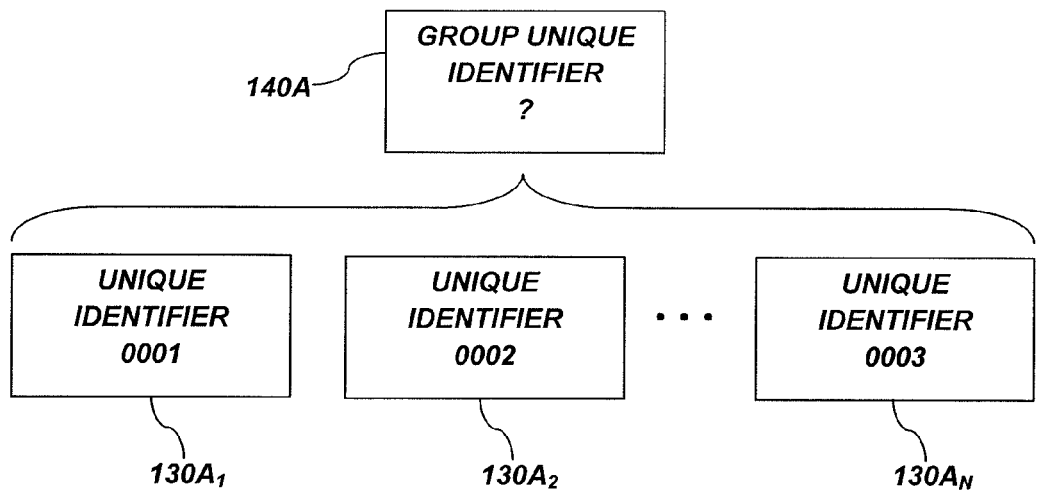
FIGS. 4A and 4B illustrate a method for assigning a group unique identifier to a user group according to another embodiment of the present disclosure.
Figure 4B:
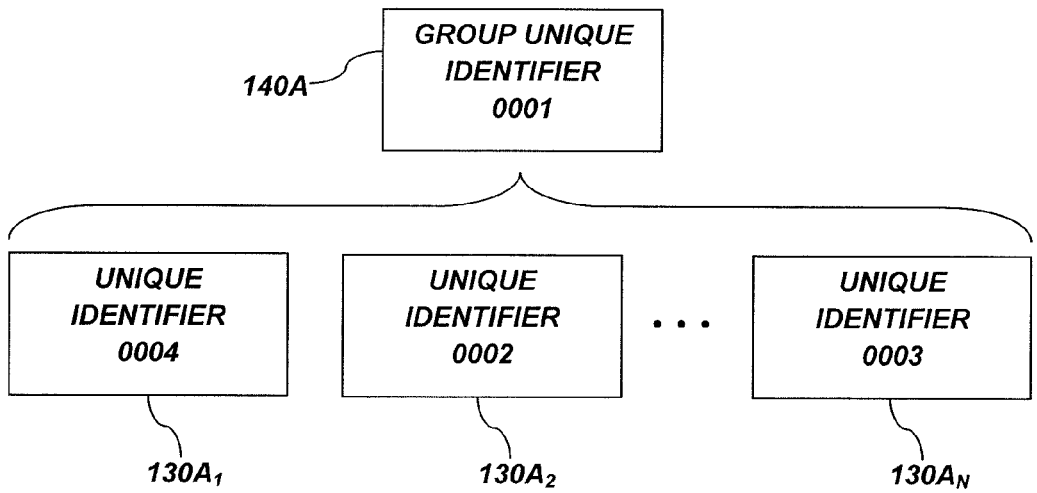

FIGS. 4A and 4B illustrate a method for assigning a group unique identifier 140 to a user group 120 according to another embodiment of the present disclosure. In particular, the first group 120A (FIG. 1) may receive a group unique identifier 140A to be associated with each of the communication devices 202 (FIG. 1) that are members of the first group 120A. As depicted in FIGS. 4A and 4B, the group unique identifier 140A may be a selected from an existing individual unique identifier 130A that was previously an individual unique identifier $130A_1$, $130A_2$, $130A_N$ that is associated with one of the communication of the first user group 120A.

For example, in some embodiments, the group unique identifier 140A assigned to the user group 120A may be selected from among the individual unique identifiers $130A_1$, $130A_2$, . . . $130A_N$ that are part of the user group 120A. For example, the individual unique identifier $130A_1$ of the first communication device $202A_1$ may be "promoted" to be the group unique identifier 140A for the first user group 120A. As a result, the individual unique identifier $130A_1$ ("0001") previously associated with the first communication device $202A_1$ may be "sacrificed" and becomes the unique identifier 140A for the first user group 120A. In some embodiments, another individual unique identifier $130A_1$ ("0004") may be assigned to the first communication device $202A_1$ so that the first communication device $202A_1$ may remain associated with both the individual unique identifier $130A_1$ and the group unique identifier 140A associated with the first user group 120A.

When a user group 120 is established, the information (contacts, blocked calls, etc.) associated with the individual communication devices 202 may become group information (i.e., accessible through the other communication devices 202 of the user group 120), as desired by the user. In some embodiments involving a user group 120 initiated through promotion of an existing individual unique identifier 130 to become the group unique identifier 140 associated with the user group 120, only the information for that individual communication device 202 (e.g., communication device $202A_1$) may be promoted to be group information.

Even though the establishment of the user group 120A is described with reference to FIGS. 3A, 3B, 4A, and 4B in terms of assigning the group unique identifier 140A to a newly established user group 120A, similar methods may be used to change the group unique identifier 140 after the user group 120 has been established. Therefore, the group unique identifier 140 assigned to the user group 120 may be changed by assigning a completely new group unique identifier 140 to the user group 120. In addition, the group unique identifier 140 may be changed by promoting one of the individual unique identifiers 130 to be the new group unique identifier 140 assigned to the user group 120, which may cause that a new individual unique identifier 130 be assigned to the corresponding communication device 202. In addition, the group unique identifier 140 associated with the user group 120 may be "demoted." In other words, the group unique identifier 140 assigned to the user group 120 may once again become associated with a corresponding first communication device 202, and a new group unique identifier 140 may be assigned (e.g., new issuance, promotion, etc.) to the user group 120, or the user group 120 may be dissolved.

Figure 5A:
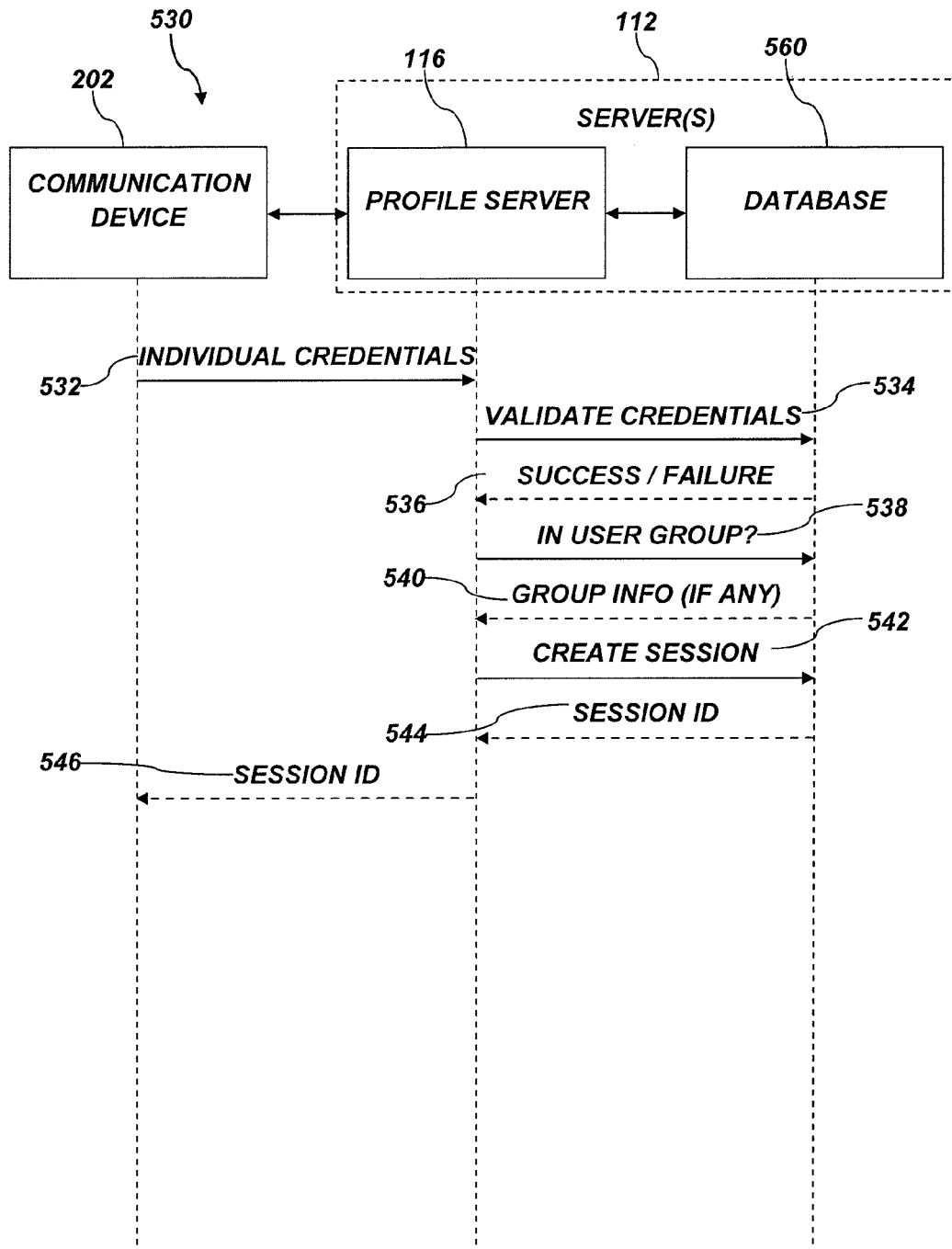
FIGS. 5A and 5B are data flow charts illustrating data flow between a communication device, a profile server, and a database associated with the profile server.
Figure 5B:
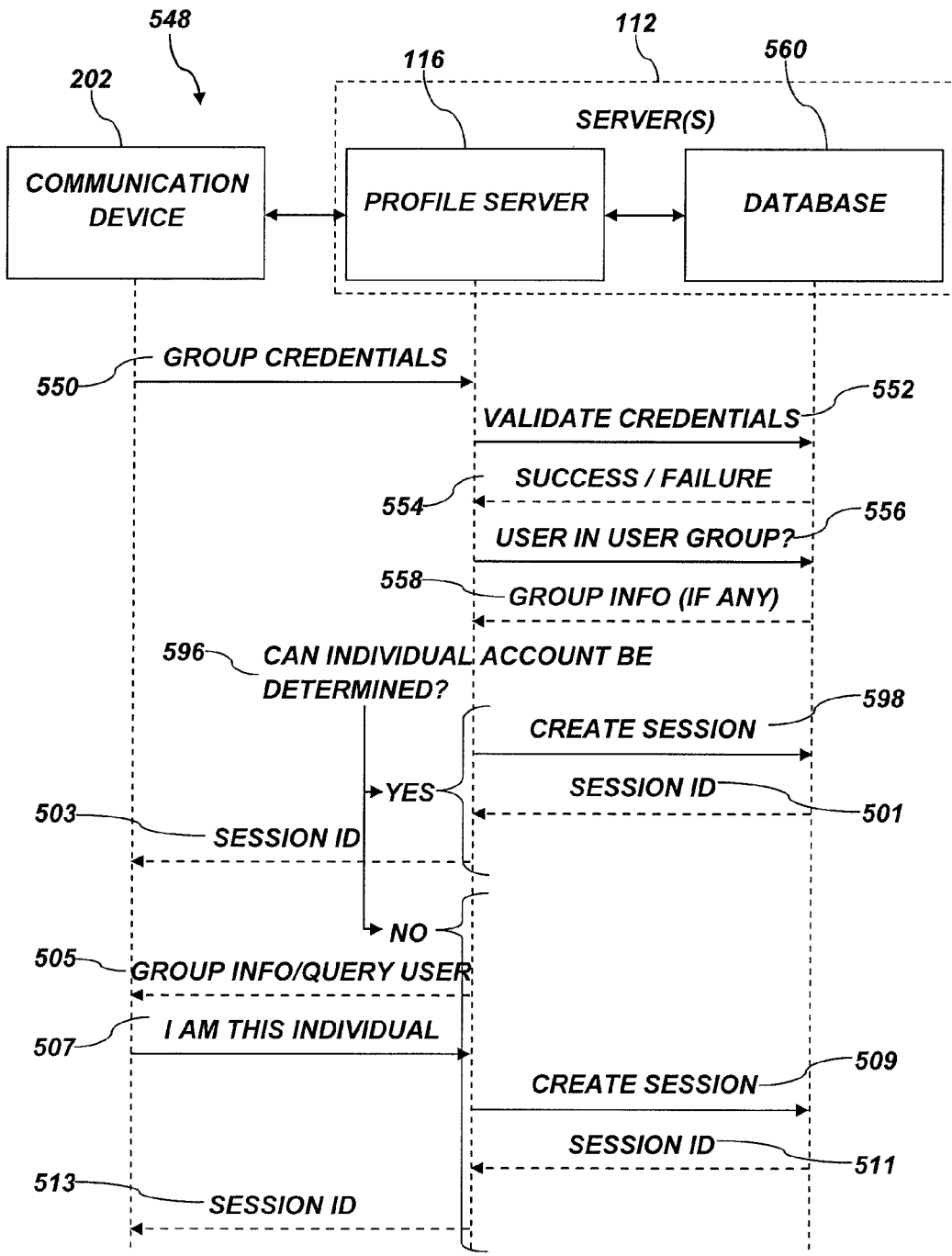

FIGS. 5A and 5B are data flow charts 530, 548 illustrating data flow between a communication device 202, a profile server 116, and a database 560 associated with the profile server 116. FIG. 5A illustrates data flow resulting from communication device 202 logging in with individual credentials associated with the communication device to access account information. FIG. 5B illustrates data flow resulting from the communication device 202 logging in with group credentials associated with a user group 120 to access account information, the communication device 202 belonging to the user group 120.

The database 560 may be configured to store individual account information corresponding to the communication device 202 and group account information corresponding to a user group 120 (FIG. 1) to which the communication device 202 belongs. Individual account information may include valid individual log in credentials (also referred to herein as "individual credentials"), user information, and individual communication device 202 information associated with the communication device 202. Group account information may include valid group log in credentials (also referred to herein as "group credentials"), user information, and group information associated with the user group. The group account information may also include information corresponding to a plurality of communication devices 202 that belong to the user group 120.

Referring to FIG. 5A, the user of the communication device 202 may provide individual credentials through the user interface 222 (FIG. 2) of the communication device 202. By way of non-limiting example, the individual credentials may be a user name and password. In some embodiments, the user name may be the individual unique identifier 130 assigned to the communication device 202. Other individual credentials, such as for example a user selected user name, are also contemplated.

At operation 532, the communication device 202 may send the individual credentials through the networks 110 (FIG. 1) to the profile server 116. At operation 534, the profile server 116 may send a validation request to the database 560 to validate the individual credentials provided by the user against the valid individual credentials stored in the database 560.

At operation 536, the database 560 may send a success/failure signal to the profile server 116 indicating either success or failure of the log in attempted by the user of the communication device 202. If the individual credentials provided by the user of the communication device 202 do not match those stored in the database 560, then the success/failure signal sent to the profile server 116 may indicate failure of the log in attempt. As a result, the user may not be given access to account information. If, on the other hand, the log in credentials provided by the user of the communication device 202 match those stored on the database 560, the success/failure signal sent to the profile server 116 may indicate a successful log in attempt. As a result, the user may be given access to the individual account information.

In some embodiments, the profile server 116 may also cause the communication device to give the user access to the group account information along with the individual account information if the communication device 202 belongs to the user group 120. If, however, the communication device 202 is not associated with the user group 120, then the profile server 116 may cause the communication device 202 to only access the individual account information. In other embodiments, logging in with the individual credentials may exclude the communication device 202 from accessing the group account information regardless of whether the communication device 202 belongs to the user group.

If the log in attempt succeeds, at operation 538 the profile server 116 may query the database 560 to determine whether the communication device 202 belongs to a user group 120. At operation 540, the database 560 may send the group account information to the profile server 116 if the communication device 202 is part of the user group 120. If, on the other hand, the communication device 202 is not part of the user group 120, the database 560 may only send the individual account information, and not the group account information.

The profile server 116 may create a session and cause a session identifier to be stored on the database 560 at operation 542. At operation 544, the database may send the session identifier to the profile server 116. At operation 546, the profile server 116 may send the session identifier through the networks 110 to the communication device 202, and the user may operate the communication device 202 as both the communication device 202 and the user group 120 if the communication device 202 belongs to the user group 120, and only as the communication device 202 if the communication device 202 does not belong to the user group 120.

Referring to FIG. 5B, the user of the communication device 202 may provide group credentials through the user interface 222 (FIG. 2) of the communication device 202. The group credentials may include a user name and password. In some embodiments, the user name may be the group unique identifier 140 assigned to the communication device 202. Other group credentials, such as for example a user selected username, are also contemplated.

At operation 550, the communication device 202 may send the group credentials through the networks 110 (FIG. 1) to the profile server 116. At operation 552, the profile server 116 may send a validation request to the database 560 to validate the group credentials provided by the user against the valid group credentials stored in the database 560.

At operation 554, the database 560 may send a success/failure signal to the profile server 116 indicating either success or failure of the log in attempted by the user of the communication device 202. If the group credentials provided by the user of the communication device 202 do not match those stored in the database 560, then the success/failure signal sent to the profile server 116 may indicate failure of the log in attempt. As a result, the user may not be given access to account information. If, on the other hand, the group credentials provided by the user of the communication device 202 match those stored on the database 560, the success/failure signal sent to the profile server 116 may indicate a successful log in attempt. As a result, the user may be given access to the group account information.

If the log in attempt succeeds, at operation 556 the profile server 116 may query the database 560 to determine whether the communication device 202 belongs to a user group 120. At operation 558, the database 560 may send the group account information to the profile server 116 if the communication device 202 is part of the user group 120. If, on the other hand, the communication device 202 is not part of the user group 120, the database 560 may not send the group account information.

Once the user succeeds in logging in with group credentials, at operation 596 the profile server 116 may attempt to determine which individual account information to give the communication device 202 access to along with the group account information. If the profile server 116 succeeds in determining which individual account information to provide, the profile server 116 may create a session and cause a session identifier to be stored on the database 560 at operation 598. At operation 501, the database may send the session identifier to the profile server 116. At operation 503, the profile server 116 may send the session identifier through the networks 110 to the communication device 202, and the user may operate the communication device 202 as both the communication device 202 and the user group 120.

Returning to operation 596, if the profile server cannot determine which individual account information to provide to the user, at operation 505 the profile server may send the group account information to the communication device 202 and query the user to indicate which individual account information to provide. At operation 507, the user may indicate the individual account information that should be provided, and the indication may be sent to the profile server 116. At operation 509, the profile server may create a session, and cause a session identifier to be stored in the database 560. The database 560 may send the session identifier to the profile server 116 at operation 511, and the profile server 116 may send the session identifier through the networks 110 to the communication device 202 at operation 513. The user may then operate the communication device 202 as both the communication device 202 and the user group 120. As a result, using a group unique identifier 140 to log in may also cause the communication device 202 to communicate with the one or more servers 112 responsive to being addressed by the individual unique identifier 130 assigned to the communication device.

Figure 6:
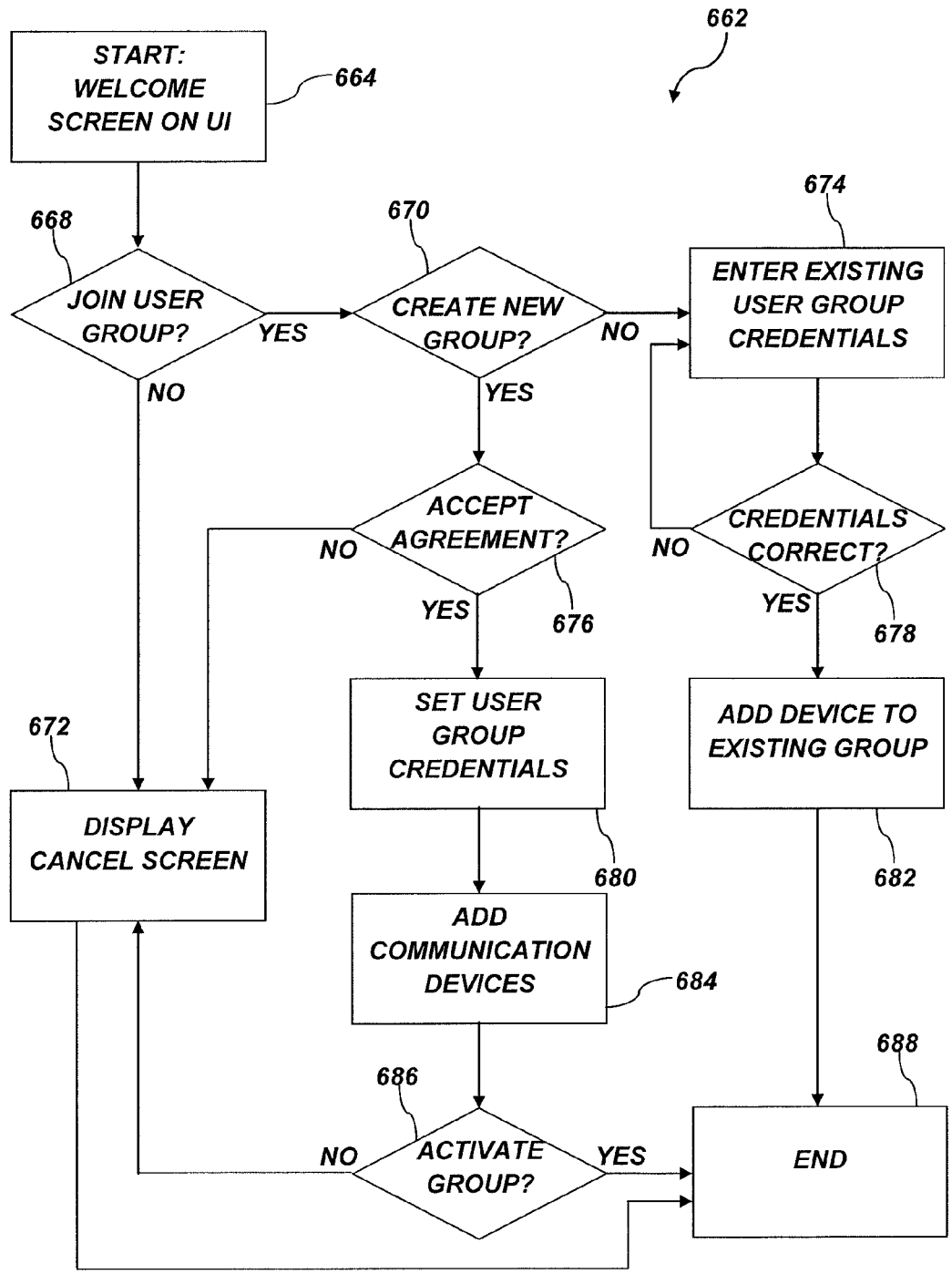
FIG. 6 is a flowchart of a method for adding a communication device to a new or existing user group.

FIG. 6 is a flowchart 662 of a method for adding a communication device 202 (FIGS. 1 and 2) to a new or existing user group 120. At operation 664, the user interface 222 (FIG. 2) may display a welcome screen to a user of the communication device 202. At operation 668, the user interface 222 may display an option to join a user group 120 (FIG. 1). If the user rejects the option to join a user group 120, at operation 672 the user interface 222 may display a cancel screen, and at operation 688 the method may end. If the user accepts the option to join a user group 120, at operation 670 the user interface 222 may provide an option to create a new user group 120.

If the option to create a new user group 120 is accepted, at operation 676 the user interface 222 may display an agreement delineating any terms required for creating the new user group 120, and an opportunity is provided to accept or reject the agreement. If the agreement is rejected, at operation 672 the user interface 222 may display the cancel screen, and at operation 688 the method may end. If, on the other hand, the agreement is accepted, at operation 680 the user interface 222 may prompt the user to set group credentials, including, for example, a group unique identifier 140 (FIG. 1) and a password. At operation 684 the user interface 222 may prompt the user to add other communication devices 202 to the new user group 120. The profile server 116 (FIG. 2) may send invitations to join the new user group 120 to any communication devices 202 added by the user. At operation 686, the user interface 222 may provide the user an option to activate the new user group 120. If the user elects to activate the new user group 120, the new user group 120 may be activated, and at operation 688 the method may end. If the user elects not to activate the new user group 120, at operation 672 the cancel screen may be displayed, and at operation 688, the method may end.

Going back to operation 670, if the option to create a new user group 120 is denied, the user interface 222 may prompt the user to enter existing user group 120 credentials at operation 674. At operation 678, if the credentials are not correct, the user interface 222 may once again prompt the user to enter existing user group 120 credentials at operation 674. At operation 678, if the credentials are correct, the communication device 202 may be added to the existing user group 120 at operation 682. At operation 688 the method may end.

Figure 7A:
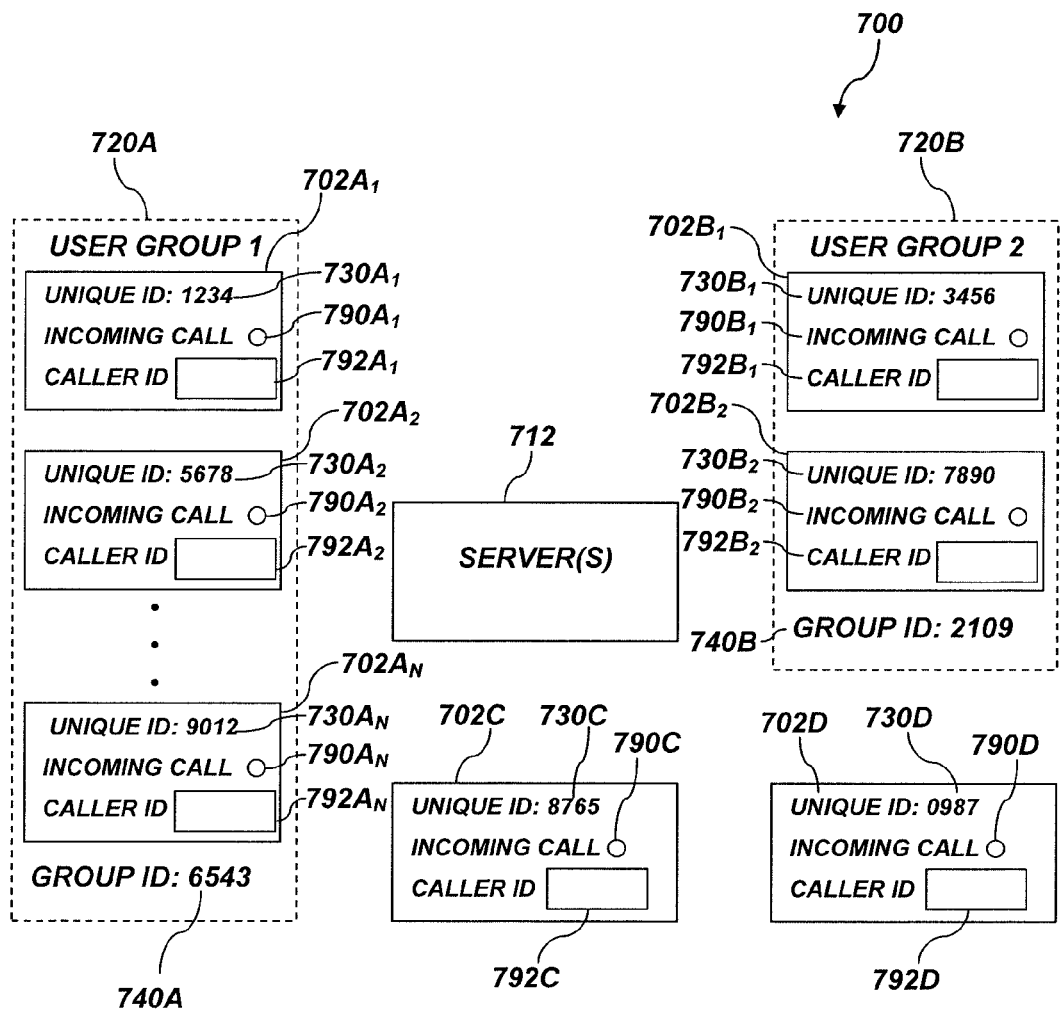
FIGS. 7A through 7F are simplified block diagrams of a communication system illustrating some examples of some of a plurality of communication devices operating both as individuals and as user groups.

FIGS. 7A through 7F are simplified block diagrams of a communication system 700 illustrating some examples of some of a plurality of communication devices $702A_1$, $702A_2$, ... $702A_N$, $702B_1$, $702B_2$, 702C, 702D (referred to herein collectively as communication devices 702) operating both as individuals and as user groups 720A, 720B (referred to herein collectively as user groups 720) within a communication system 700. FIG. 7A is a simplified block diagram of the communication system 700, including the communication devices 702, and one or more servers 712 (referred to herein as the servers 712). The communication system of FIGS. 7A through 7F is similar to the communication system 100 of FIG. 1, except FIGS. 7A through 7F do not show the network 110, and FIGS. 7A through 7F include an additional communication device 702D not shown in FIG. 1. Although the networks 110 of FIG. 1 are not shown in FIGS. 7A through 7F, it should be understood that interactions between the communication devices 702, and between the communication devices 702 and the servers 712 occur through one or more networks similar to the networks 110 of FIG. 1.

In FIGS. 7B through 7F, not all the reference numerals shown in FIG. 7A are shown. Those reference numerals referred to specifically with respect to each of FIGS. 7B through 7F are shown, along with the communication system 700 reference numeral, user group reference numerals 720, and communication device reference numerals 702.

The communication devices 702 and the servers 712 may be similar to the communication devices 202 and the servers 112 of FIG. 1. Some of the plurality of communication devices 702 may be associated with a user group 720. By way non-limiting example, communication devices $702A_1$, $702A_2$, ... $702A_N$ may be associated with a first user group 720A, and communication devices $702B_1$, $702B_2$ may be associated with a second user group 720B. Other communication devices 702 may not be associated with any user group 720. For example, communication devices 702C, 702D may not be associated with any user group.

Each of the communication devices 702 may be assigned an individual unique identifier 730. By way of non-limiting example, communication devices $702A_1$, $702A_2$, ... $702A_N$, $702B_1$, $702B_2$, 702C, 702D may be assigned individual unique identifiers $730A_1$, $730A_2$, ... $730A_N$, $730B_1$, $730B_2$, 730C, 730D, respectively. The individual unique identifiers 730 are similar to the individual unique identifiers of FIG. 1. In FIGS. 7A through 7F, each of the individual unique identifiers 730 are four-digit numbers. The present disclosure, however, is not so limiting. As discussed above with respect to the individual unique identifiers 130 of FIG. 1, the individual unique identifiers 730 may take various forms.

Each of the user groups 720 may be assigned a group unique identifier 740. By way of non-limiting example, the first user group 720A may be assigned a first group unique identifier 740A, and the second user group 720B may be assigned a second group unique identifier 740B. The group unique identifiers 740 are similar to the group unique identifiers of FIG. 1. In FIGS. 7A through 7F, each of the group unique identifiers 740 are four-digit numbers. The present disclosure, however, is not so limiting. Similar to the individual unique identifiers 730, group unique identifiers 740 may take various forms.

The communication devices associated with a user group may be configured to operate in the communication system 700 both as individual communication devices 702 assigned individual unique identifiers 730, and as members of the user group 720. Those communication devices 702 not associated with a user group 720 may operate as individual communication devices 702 assigned individual unique identifiers 730.

Each of the communication devices 702 may be configured to send a call request 794 (FIGS. 7B through 7F) through the servers 712. The call request 794 may indicate an individual unique identifier 730 assigned to a communication device 702, or a group unique identifier 740 assigned to a user group 720, that a user initiating the call request 794 desires to call.

Each of the communication devices may include an incoming call indicator 790, and a caller identification indicator 792 (incoming call indicators $790A_1$, $790A_2$, ... $790A_N$, $790B_1$, $790B_2$, 790C, 790D are included in communication devices $702A_1$, $702A_2$, ... $702A_N$, $702B_1$, $702B_2$, 702C, 702D, respectively, and caller identification indicators $792A_1$, $792A_2$, ... $792A_N$, $792B_1$, $792B_2$, 792C, 792D are included in communication devices $702A_1$, $702A_2$, ... $702A_N$, $702B_1$, $702B_2$, 702C, 702D, respectively). The incoming call indicator 790 may be configured to indicate an incoming call. By way of non-limiting example, the incoming call indicator 790 may indicate the incoming call visually, tactilely, audibly, some other suitable indication, and combinations thereof.

Responsive to receiving a call request 794 indicating an individual unique identifier 730, the servers 712 may cause only the communication device 702 with the individual unique identifier 730 indicated in the call request 794 assigned thereto to indicate an incoming call with its incoming call indicator 790. Also, responsive to receiving a call request 794 indicating a group unique identifier 740, the servers 712 may cause all the communication devices 702 associated with a user group 720 with the group unique identifier 740 indicated in the call request 794 assigned thereto to indicate an incoming call.

The caller identification indicator 792 may be configured to indicate a source of an incoming call. The caller identification indicator 792 may be configured to indicate a user group 720 if the communication device 702 initiating the call request 794 is associated with the user group 720 and logged in with the group unique identifier 740. The caller identification indicator 792 may be configured to indicate the individual communication device 702 initiating the call request 794 if it is not associated with a user group 720.

In some instances, a first communication device 702 associated with a user group 720 may be logged in to a first communication device with an individual unique identifier 730 assigned to the first communication device 702, instead of with the group unique identifier 740. In some embodiments, a second communication device 702 that receives the call from the first communication device may still indicate the group unique identification 740 of the user group 720 that the first communication device 702 is associated with on its caller identification indicator 792. In other embodiments, the second communication device 702 may indicate the individual unique identification 730 assigned to the first communication device.

Each of the caller identification indicators 792 of FIGS. 7A through 7F include a field of a display configured to display an individual unique identifier 730 or a group unique identifier assigned to a communication device 702 or user group 720 that is the source of the call request 794 triggering the incoming call. In other embodiments, the caller identification indicator 792 may be configured to display a photograph of one or more user of the communication device 702 or user group 720 that placed the call request 794. In additional embodiments, the caller identification indicator 792 may be configured to display a graphic, a text string, a nickname, or a name of a user of the communication device 702 or user group 720 that placed the call request 794. In still other embodiments, the caller identification indicator 792 may indicate a source of an incoming call with visual, tactile, and/or audible patterns. By way of non-limiting example, U.S. Pat. No. 7,769,141 to Cupal et al., the disclosure of which is incorporated herein by reference in its entirety, discloses a caller identification visual alerting device including a spatial visual indicator configured to activate a plurality of illuminatable elements in a pattern corresponding to a source of an incoming call. Also by way of non-limiting example, U.S. Patent Publication 2012/0196580 to Simmons et al., the disclosure of which is incorporated herein by reference in its entirety, discloses a caller identification device configured to generate tactile patterns associated with a source of an incoming call.

Figure 7B:
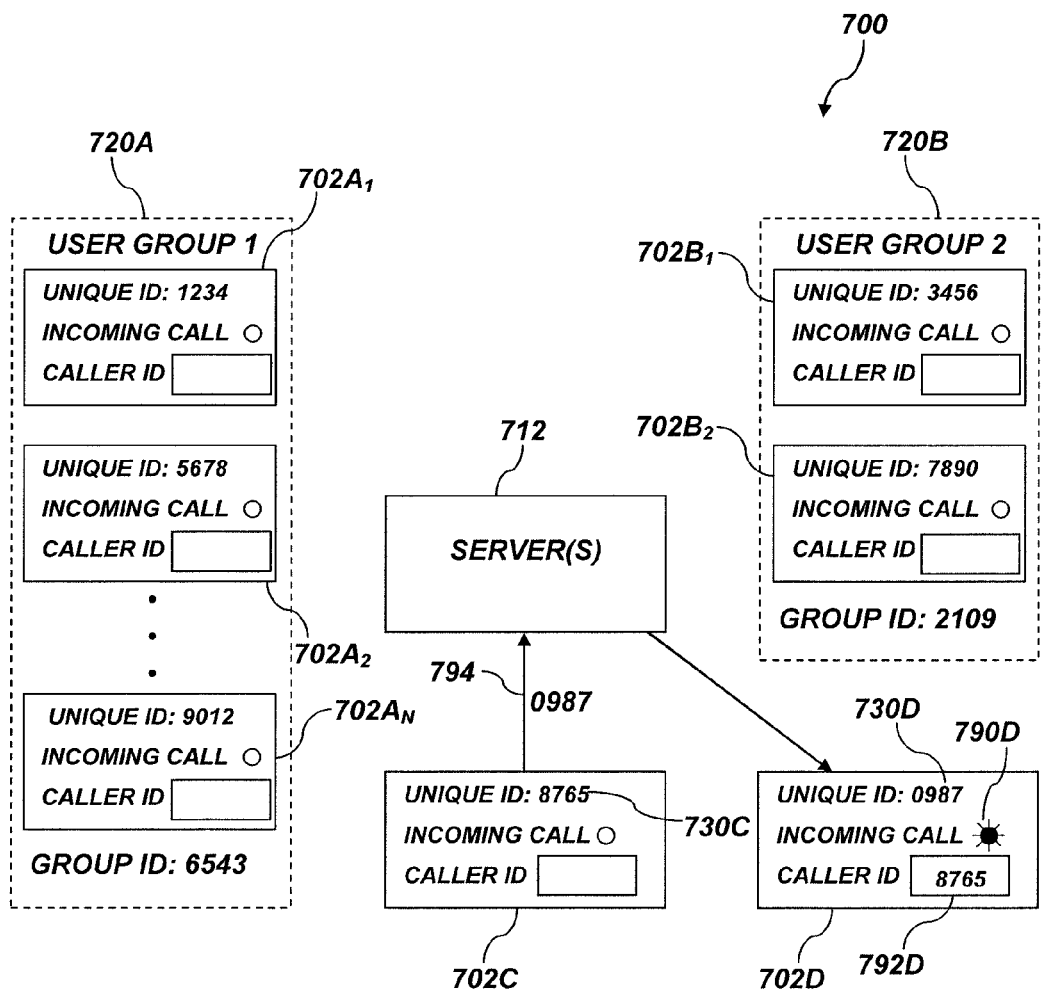

FIG. 7B illustrates an example of a call request 794 initiated by a communication device 702C not associated with a user group 720, and directed to a communication device 702D also not associated with a user group 720. The servers 712 may receive the call request 794 from communication device 702C indicating individual unique identifier 730D (0987) assigned to communication device 702D. In response to the call request 794, the servers 712 may cause communication device 702D to indicate an incoming call with the incoming call indicator 790D (darkened and accentuated with lines to show incoming call indicator 790D indicating an incoming call). The servers 712 may also cause the caller identification indicator 792D to indicate the individual unique identifier 730C (8765) of the communication device 702C initiating the call.

Figure 7C:
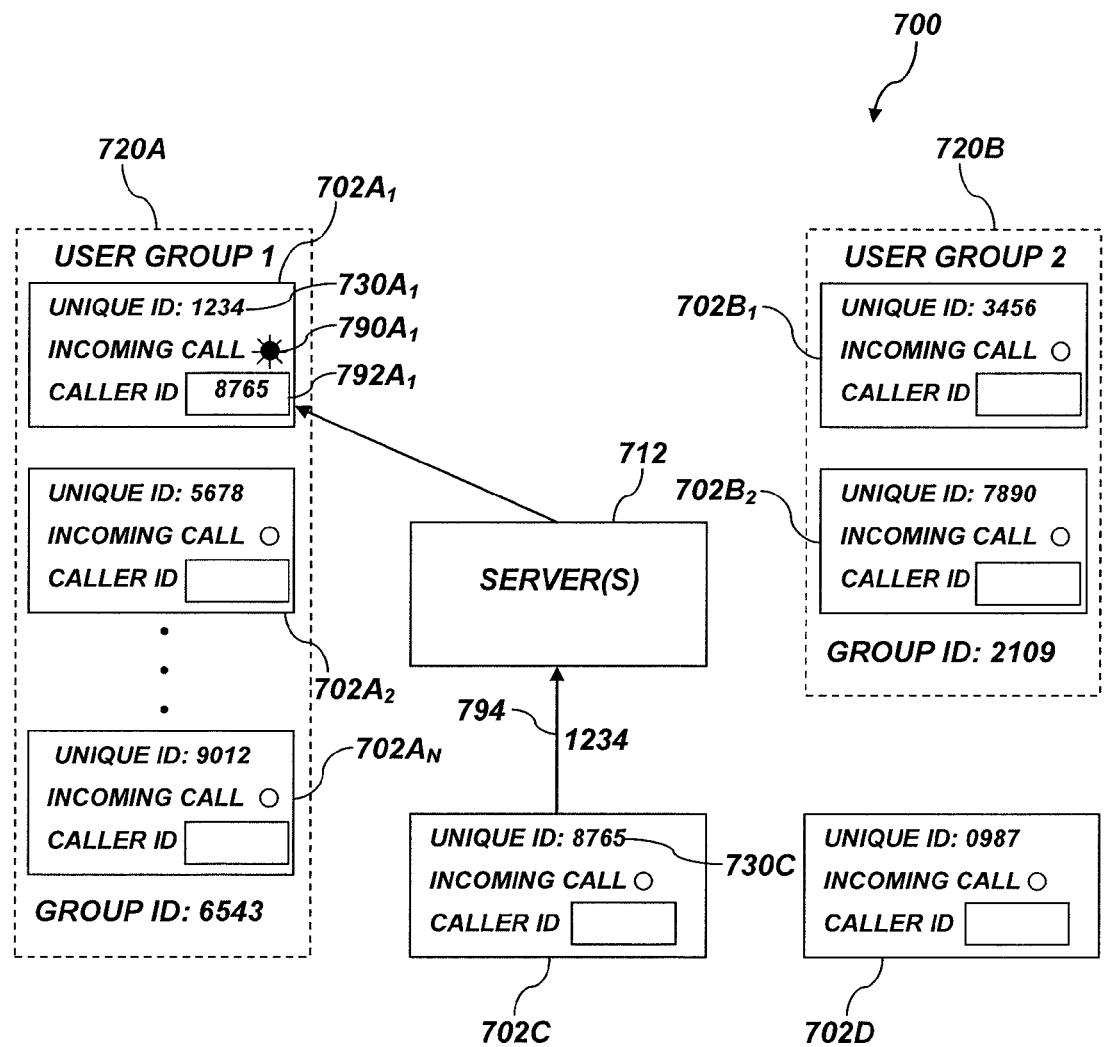

FIG. 7C illustrates an example of a call request 794 initiated by a communication device 702C not associated with a user group 720, and directed to a communication device $702A_1$ that is associated with a user group 720A. The servers 712 may receive the call request 794 from communication device 702C indicating individual unique identifier $730A_1$ (1234) assigned to communication device $702A_1$. In response to the call request 794, the servers 712 may cause communication device $702A_1$ to indicate an incoming call with the incoming call indicator $790A_1$ (darkened and accentuated with lines to show incoming call indicator 790D indicating an incoming call). The servers 712 may also cause the caller identification indicator $792A_1$ to indicate the individual unique identifier 730C (8765) of the communication device 702C initiating the call.

As the call request 794 indicated the individual unique identifier $730A_1$ (1234), the servers 712 did not cause the other communication devices $702A_2$, ... $702A_N$ to indicated the incoming call or the source of the incoming call. Each communication device 702 associated with a user group 720 thus retains its identity as an individual communication device 702 despite its association with a user group 720. Any communication device 702 may send a call request 794 that may cause only one communication device 702 of a user group 720 to indicate an incoming call.

Figure 7D:
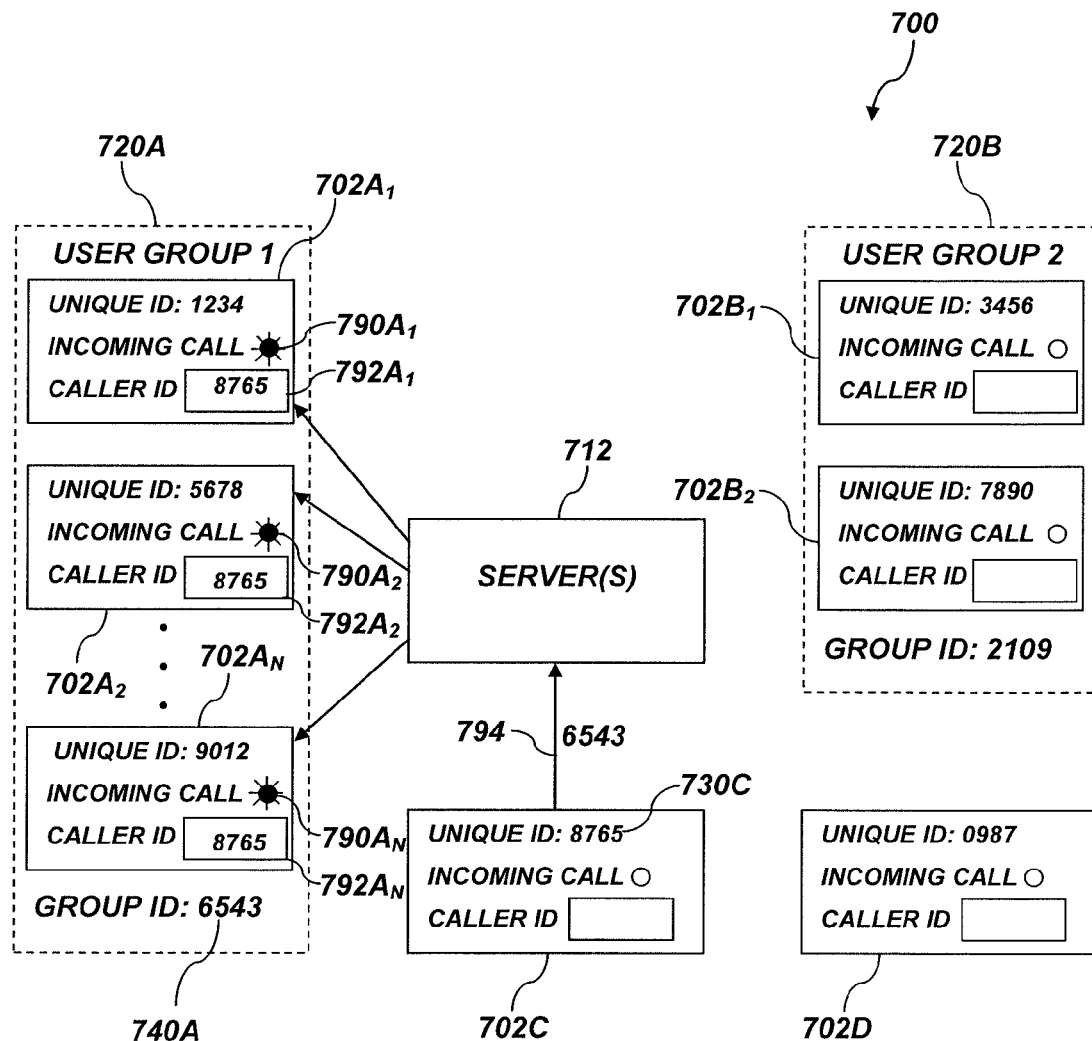

FIG. 7D illustrates an example of a call request 794 initiated by a communication device 702C not associated with a user group 720, and directed to a user group 720A. The servers 712 may receive the call request 794 from communication device 702C indicating group unique identifier 740A (6543) assigned to user group 720A. In response to the call request 794, the servers 712 may cause all of communication devices 702A$_1$, 702A$_2$, . . . 702A$_N$ associated with the user group 720A to indicate an incoming call with the incoming call indicators 790A$_1$, 790A$_2$, . . . 790A$_N$. The servers 712 may also cause the caller identification indicators 792A$_1$, 792A$_2$, . . . 792A$_N$ of all the communication devices 702A$_1$, 702A$_2$, . . . 702A$_N$ belonging to the user group 720A to indicate the individual unique identifier 730C (8765) of the communication device 702C initiating the call.

Figure 7E:
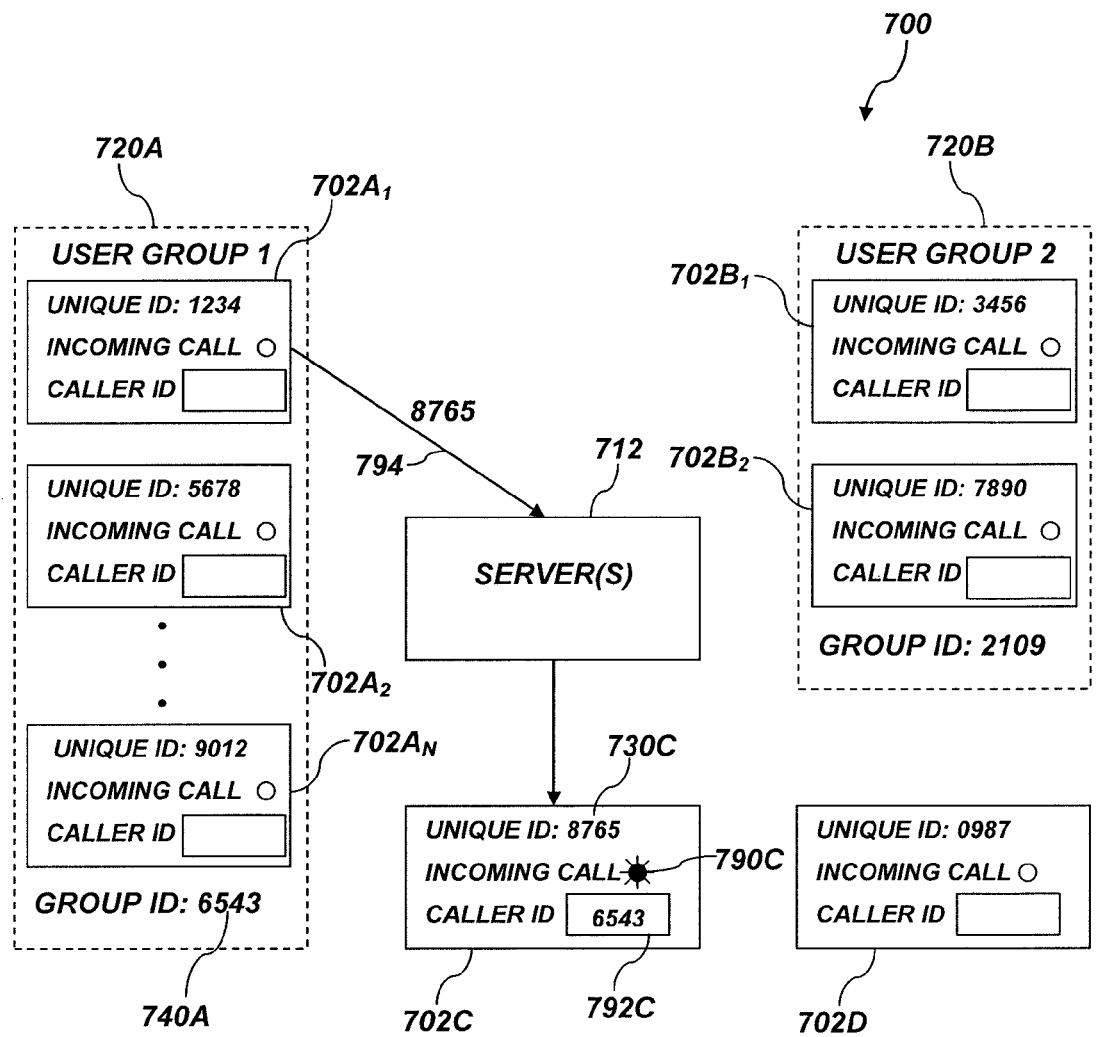

FIG. 7E illustrates an example of a call request 794 initiated by a communication device 702A$_1$ associated with a user group 720A, and directed to a communication device 702C. The servers 712 may receive the call request 794 from communication device 702A$_1$ indicating individual unique identifier 730C (8765) assigned to communication device 702C. In response to the call request 794, the servers 712 may cause communication device 702C to indicate an incoming call with the incoming call indicator 790C. The servers 712 may also cause the caller identification indicator 792C of communication device 702C to indicate the group unique identifier 740A (6543) of the user group 720A to which the communication device 702A$_1$ initiating the call belongs.

Figure 7F:
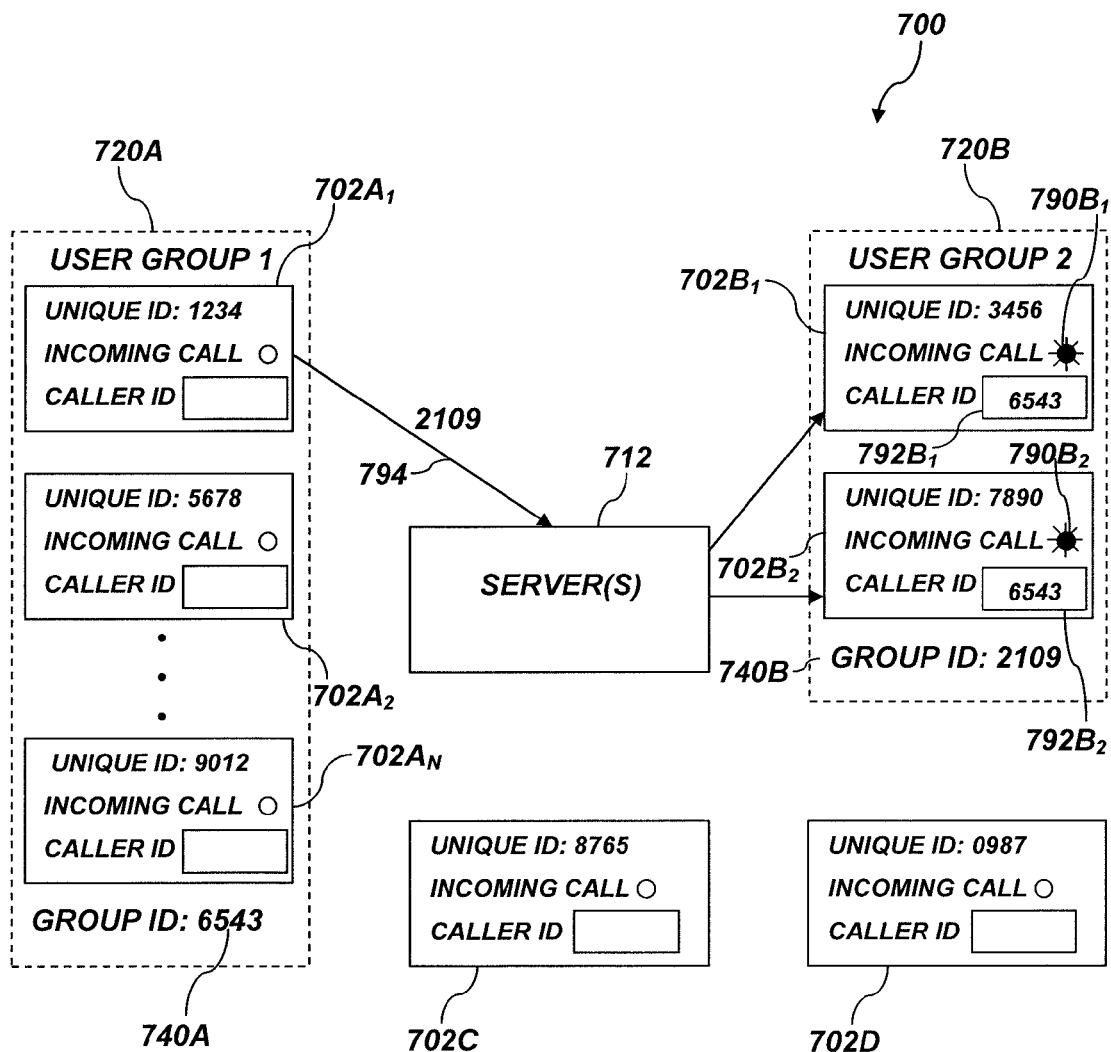

FIG. 7F illustrates an example of a call request 794 initiated by a communication device 702A$_1$ associated with a user group 720A, and directed to a user group 720B. The servers 712 may receive the call request 794 from communication device 702A$_1$ indicating group unique identifier 740B (2109) assigned to user group 720B. In response to the call request 794, the servers 712 may cause all the communication devices 702B$_1$, 702B$_2$ associated with user group 720B to indicate an incoming call with the incoming call indicators 790B$_1$, 790B$_2$. The servers 712 may also cause the caller identification indicator 792B$_1$, 792B$_2$ to indicate the group unique identifier 740A (6543) of the user group 720A initiating the call.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A communication system, comprising:
    a plurality of video communication devices including a first plurality of video communication devices and a second plurality of video communication devices, each video communication device of the plurality of video communication devices configured to receive incoming calls to participate in video communication sessions responsive to being addressed with a different individual unique identifier;
    a first user group comprising the first plurality of video communication devices, the first user group assigned a first group unique identifier, wherein each of the first plurality of video communication devices is configured to receive incoming calls to participate in video communication sessions responsive to being addressed with the first group unique identifier;
    a second user group comprising the second plurality of video communication devices, the second user group assigned a second group unique identifier, wherein each of the second plurality of video communication devices is configured to receive incoming calls to participate in video communication sessions responsive to being addressed with the second group unique identifier;
    wherein:
    each of the plurality of video communication devices is configured to:
        indicate a source of an incoming call responsive to the incoming call being directed thereto;
        indicate a user group as the source of the incoming call if a video communication device of the plurality of video communication devices belonging to the user group initiates the incoming call; and
        indicate the video communication device initiating the incoming call as the source of the incoming call if the video communication device initiating the incoming call does not belong to any user group; and
    each of the first plurality of video communication devices is configured to:
        receive assistance, while participating in the video communication sessions, from a video relay service configured to provide translation services to a hearing-impaired user of the first plurality of video communication devices during the video communication sessions; and
        indicate the second user group as the source of the incoming call responsive to a first video communication device of the second plurality of video communication devices directing an incoming call to the first user group.

2. The communication system of claim 1, wherein each video communication device of the plurality of video communication devices includes an incoming call indicator configured to indicate the source of the incoming call using the individual unique identifier or the group unique identifier assigned thereto.

3. The communication system of claim 2, wherein only an incoming call indicator of a second video communication device of the plurality of video communication devices is configured to indicate an incoming call responsive to a call placed to the second video communication device with its individual unique identifier.

4. The communication system of claim 2, wherein the incoming call indicator of each video communication device of the first plurality of video communication devices is configured to indicate an incoming call responsive to a call placed to the first group unique identifier.

5. A communication system, comprising:
    a plurality of video communication devices including a first plurality of video communication devices and a second plurality of video communication devices configured to receive incoming calls to participate in video communication sessions responsive to being addressed with a different individual unique identifier;
    a first user group comprising the first plurality of video communication devices, the first user group assigned a first group unique identifier, wherein each of the first plurality of video communication devices is configured to receive incoming calls to participate in video communication sessions responsive to being addressed with the first group unique identifier;
    a second user group comprising the second plurality of video communication devices, the second user group assigned a second group unique identifier, wherein each of the second plurality of video communication devices is configured to receive incoming calls to participate in video communication sessions responsive to being addressed with the second group unique identifier;

wherein:

each of the plurality of video communication devices is configured to:

indicate a source of an incoming call responsive to the incoming call being directed thereto;

indicate a user group as the source of the incoming call if a video communication device of the plurality of video communication devices belonging to the user group initiates the incoming call; and indicate the video communication device initiating the incoming call as the source of the incoming call if the video communication device initiating the call does not belong to any user group;

each video communication device of the plurality of first video communication devices is configured to receive assistance in participating in the video communication sessions from a video relay service configured to provide translation services to a hearing-impaired user of the first plurality of video communication devices during the communication sessions; and only a first video communication device of the first plurality of video communication devices is configured to indicate the second user group as the source of the incoming call responsive to a first video communication device of the second plurality of video communication devices directing an incoming call to the first video communication device of the first plurality of video communication devices.

6. A communication system, comprising:

a plurality of communication devices configured to be associated with a user group, wherein each communication device of the plurality of communication devices is configured to communicate with one or more servers responsive to being addressed both with an individual unique identifier assigned thereto and a group unique identifier assigned thereto as a member of the user group;

wherein the one or more servers are configured to:

receive a set of log in credentials from a first communication device of the plurality of communication devices, wherein the first communication device is configured to receive the set of log in credentials from a user through a user interface of the first communication device;

verify the set of log in credentials from the user against at least one of:

a valid set of group log in credentials corresponding to the user group stored in a database of the one or more servers; and a valid set of individual log in credentials associated with the first communication device stored in the database; and provide a set of group account information and a set of individual account information to a first communication device responsive to verifying that the set of log in credentials received from the first communication device match either of the valid set of group log in credentials, and the valid set of individual log in credentials associated with the first communication device.

7. The communication system of claim 6, wherein the one or more servers are further configured to attempt to determine what set of individual account information should be provided to the first communication device if the user provides a set of login credentials that matches the valid set of group log in credentials.

8. The communication system of claim 6, wherein the set of group account information comprises a shared list, wherein the shared list includes one or more items from the group consisting of a blocked caller list, a group message history, one or more group text messages, one or more group video messages, a group call history, a group contact list, and group settings.

9. The communication system of claim 6, wherein the profile server is configured to receive a change to the set group account information from any of the plurality of communication devices associated with the user group, broadcast a notification that the change has been made to each of the rest of the plurality of communication devices, and send a changed set of group account information to each of the rest of the plurality of communication devices.

10. The communication system of claim 6, wherein the one or more servers are configured to:

cause the first video communication device of the plurality of video communication devices to only give the user access to a set of group account information associated with the user group responsive to verifying that the set of log in credentials from the user match the valid set of group log in credentials; and cause the first video communication device to only give the user access to set of individual account information associated with the first video communication device responsive to verifying that the set of log in credentials from the user match the valid set of individual log in credentials associated with the first video communication device.

11. A method of operating a plurality of communication devices, the method comprising:

operating one or more of a plurality of communication devices to communicate with one or more servers, each of the plurality of communication devices assigned a different unique identifier of a plurality of individual unique identifiers;

operating two or more of the plurality of communication devices as members of a first user group with the one or more servers, the first user group comprising a first plurality of communication devices of the plurality of communication devices, wherein the first user group is assigned a first group unique identifier; and allowing a user to access a set of first group account information associated with the first user group by accepting either of:

a set of first group log in credentials corresponding to the first user group at any first communication device of the first plurality of communication devices; and a set of individual log in credentials associated with the any first communication device at the any first communication device;

wherein allowing a user to access a set of first group account information comprises:

allowing the user to change the set of first group account information, wherein the first group account information includes any item from the group consisting of a blocked caller list, a group message history, one or more group text messages, one or more group video messages, a group call history, a group contact list, and group settings; and sending the changed set of first group account information to the rest of the first communication devices in the first user group.

12. The method of claim 11, wherein accepting the set of first group log in credentials comprises:
  causing the any first video communication device to prompt the user to provide the set of first group log in credentials to a user interface of the any first video communication device;
  receiving the set of first group log in credentials from the any first video communication device at the one or more servers;
  validating the set of first group log in credentials provided by the user against a valid set of first group log in credentials stored on a database of the one or more servers; and
  allowing the user to access the set of first group account information.

13. A method of operating a plurality of communication devices, the method comprising:
  operating one or more of a plurality of communication devices to communicate with one or more servers, each of the plurality of communication devices assigned a different unique identifier of a plurality of individual unique identifiers;
  operating two or more of the plurality of communication devices as members of a first user group with the one or more servers, the first user group comprising a first plurality of communication devices of the plurality of communication devices, wherein the first user group is assigned a first group unique identifier; and
  allowing a user to access a set of first group account information associated with the first user group by accepting either of:
    a set of first group log in credentials corresponding to the first user group at any first communication device of the first plurality of communication devices; and
    a set of individual log in credentials associated with the any first communication device at the any first communication device;
  wherein accepting the set of individual log in credentials comprises:
    causing the any first communication device to prompt the user to provide the set of individual log in credentials to a user interface of the any first communication device;
    receiving a log in request from the any first communication device at the one or more servers, the log in request including the set of individual log in credentials provided by the user;
    validating the set of individual log in credentials provided by the user against a valid set of individual log in credentials corresponding to the any first communication device stored on a database of the one or more servers; and
    allowing the user to access the set of first group account information.

14. The method of claim 11, further comprising:
  receiving a call request from a second video communication device of the plurality of video communication devices indicating the first common group unique identifier as a desired destination for a call; and
  causing all the first video communication devices of the first user group to indicate an incoming call.

15. The method of claim 14, further comprising:
  causing each of the first plurality of video communication devices belonging to the first user group to indicate the second video communication device as the source of the incoming call if the second video communication device does not belong to any user group; and
  causing each of the first plurality of video communication devices belonging to the first user group to indicate a second user group as the source of the incoming call if the second video communication device belongs to a second user group.

16. A communication system, comprising:
  a plurality of video communication devices including a second video communication device not belonging to any user group and a first plurality of video communication devices, each video communication device of the plurality of video communication devices configured to receive incoming calls to participate in video communication sessions responsive to being addressed with a different individual unique identifier; and
  a first user group comprising the first plurality of video communication devices, the first user group assigned a first group unique identifier, wherein each of the first plurality of video communication devices is configured to receive incoming calls to participate in video communication sessions responsive to being addressed with the first group unique identifier;
  wherein:
    each of the plurality of video communication devices is configured to:
      indicate a source of an incoming call responsive to the incoming call being directed thereto;
      indicate a user group as the source of the incoming call if a video communication device of the plurality of video communication devices belonging to the user group initiates the incoming call;
      indicate the video communication device initiating the incoming call as the source of the incoming call if the video communication device initiating the incoming call does not belong to any user group;
    each video communication device of the first plurality of video communication devices is configured to receive assistance in participating in the video communication sessions from a video relay service configured to provide translation services to a hearing-impaired user of the first plurality of video communication devices during the video communication sessions; and
    the second video communication device is configured to indicate the first user group as the source of the incoming call responsive to a first video communication device of the first plurality of video communication devices directing the incoming call to the second video communication device.

17. The communication system of claim 16, wherein each of the plurality of video communication devices is configured to indicate the source of the incoming call with any indication from the group consisting of a visual indication, an audible indication, and a tactile indication.

18. The communication system of claim 16, wherein each of the plurality of video communication devices is configured to indicate the source of the incoming call visually by displaying any indicator from the group consisting of an individual unique identifier, a group unique identifier, a graphic, a photograph of a user, a text string, a name, and a nickname corresponding to the source of the incoming call.

19. The communication system of claim 16, further comprising:
  a second plurality of video communication devices of the plurality of video communication devices; and
  a second user group comprising the second plurality of video communication devices, the second user group assigned a second group unique identifier, wherein each of the second plurality of video communication devices is configured to receive incoming calls to participate in video communication sessions responsive to being addressed with the second group unique identifier.

20. The communication system of claim 19, wherein each of the first plurality of video communication devices is configured to indicate the second user group as the source of the incoming call responsive to a first video communication device of the second plurality of video communication devices directing an incoming call to the first user group.

21. The communication system of claim 19, wherein only a first video communication device of the first plurality of video communication devices is configured to indicate the second user group as the source of the incoming call responsive to a first video communication device of the second plurality of video communication devices directing an incoming call to the first video communication device of the first plurality of video communication devices.

22. The communication system of claim 16, wherein each of the first plurality of video communication devices is configured to indicate the second video communication device as the source of the incoming call responsive to the second video communication device directing the incoming call to the first user group.

23. The communication system of claim 16, wherein only a first video communication device of the first plurality of video communication devices is configured to indicate the second video communication device as the source of the incoming call responsive to the second video communication device directing the incoming call to the first video communication device of the first plurality of video communication devices.

24. The communication system of claim 16, wherein the plurality of video communication devices further includes a third video communication device not belonging to any user group, wherein the third video communication device is configured to indicate the second video communication device as the source of an incoming call responsive to the second video communication device directing the incoming call to the third video communication device.

25. The communication system of claim 16, wherein each of the plurality of video communication devices is configured to display:
  the group unique identifier if the user group is identified as the source of the incoming call; and
  an individual unique identifier assigned to the video communication device initiating the incoming call if the video communication device initiating the incoming call is identified as the source of the incoming call.

26. The communication system of claim 6, wherein:
  the valid set of individual login credentials associated with the first video communication device includes the individual unique identifier as an individual username, and a corresponding individual password; and
  the valid set of individual login credentials associated with the user group is the group unique identifier as a group user name, and a corresponding group password.

\* \* \* \* \*

UNITED STATES PATENT AND TRADEMARK OFFICE
CERTIFICATE OF CORRECTION

PATENT NO. : 9,204,088 B2  
APPLICATION NO. : 13/840046  
DATED : December 1, 2015  
INVENTOR(S) : Parent et al.

Page 1 of 1

It is certified that error appears in the above-identified patent and that said Letters Patent is hereby corrected as shown below:

In the specification:

COLUMN 1,    LINE 7,        change "APPLICATION" to --APPLICATIONS--  
    COLUMN 5,    LINE 35,       change "the interne," to --the internet,--

In the claims:

CLAIM 10,    COLUMN 22,    LINE 28,       change "access to set of" to --access to the set of--

Signed and Sealed this  
Fourteenth Day of June, 2016

Michelle K. Lee  
*Director of the United States Patent and Trademark Office*